United States Patent
Huchet et al.

(10) Patent No.: US 8,204,128 B2
(45) Date of Patent: Jun. 19, 2012

(54) LEARNING FILTERS FOR ENHANCING THE QUALITY OF BLOCK CODED STILL AND VIDEO IMAGES

(75) Inventors: Gregory Huchet, Theix (FR);
Jean-Yves Chouinard, Quebec (CA);
Demin Wang, Ottawa (CA); Andre Vincent, Gatineau (CA)

(73) Assignee: Her Majesty the Queen in right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 992 days.

(21) Appl. No.: 12/184,671

(22) Filed: Aug. 1, 2008

(65) Prior Publication Data

US 2009/0034622 A1 Feb. 5, 2009

Related U.S. Application Data

(60) Provisional application No. 60/953,265, filed on Aug. 1, 2007.

(51) Int. Cl.
*H04N 7/12* (2006.01)
(52) U.S. Cl. .................................................. 375/240.18
(58) Field of Classification Search .................. 375/240, 375/240.01, 240.12, 240.18, 240.24, 240.29; 382/260, 261, 266, 275
See application file for complete search history.

(56) References Cited

U.S. PATENT DOCUMENTS

| | | | |
|---|---|---|---|
| 6,823,087 B1 | 11/2004 | Liu et al. | 382/266 |
| 6,859,558 B2 | 2/2005 | Hong | 382/236 |
| 7,043,092 B1 | 5/2006 | Groliere | 382/268 |
| 7,054,500 B1* | 5/2006 | Lillevold | 382/260 |
| 7,076,114 B2 | 7/2006 | Westerman | 382/275 |
| 7,102,638 B2 | 9/2006 | Raskar et al. | 345/428 |
| 7,242,815 B2 | 7/2007 | Kalevo et al. | 382/261 |
| 7,336,832 B2 | 2/2008 | Kondo et al. | 382/232 |
| 7,346,224 B2 | 3/2008 | Kong et al. | 382/261 |
| 7,346,225 B2 | 3/2008 | Guenter | 382/261 |
| 7,406,209 B2 | 7/2008 | Kim et al. | 382/268 |
| 7,738,722 B2* | 6/2010 | Gomila et al. | 382/254 |
| 7,869,523 B2* | 1/2011 | Joch et al. | 375/240.29 |

OTHER PUBLICATIONS

I.E.G Richardson, "H.264 and MPEG-4 Video Compression: Video Coding for Next-Generation Multimedia", p. 185, John Wiley & Sons, 2003.

* cited by examiner

*Primary Examiner* — Frank Duong
(74) *Attorney, Agent, or Firm* — Allen, Dyer, Doppelt, Milbrath & Gilchrist, P.A.

(57) ABSTRACT

The invention relates to a method and an apparatus for reducing blocking artifacts in block-wise coding of still and video images. A learning filter generator is provided at the image encoder for generating a set of filters and associated filtering rules for filtering cross-boundary image patterns based on representative original and decoded training images using a supervised machine learning algorithm. An adaptive filter at the image decoder receives the generated filters and associated filtering rules and performs locally adaptive filtering in accordance with the received filtering rules.

20 Claims, 14 Drawing Sheets

@relation 'Pixels'

@attribute p_1 real
@attribute p_2 real
@attribute p_3 real
@attribute p_4 real
@attribute pO_1 real
@attribute pO_2 real
@attribute pO_3 real
@attribute pO_4 real @data
94,94,94,94,92,93,92,94
94,94,94,94,95,95,94,94
94,94,94,94,95,96,95,95
95,95,96,96,95,93,94,95
96,97,97,97,96,96,96,98
97,97,97,97,97,98,97,96
97,97,97,97,97,97,98,98
98,98,98,99,99,100,101,101
99,99,99,99,99,99,100,102
100,101,102,103,101,100,100,101
106,107,110,113,100,99,105,114
115,117,119,121,121,120,112,116
...

LEARNING FILTERS FOR ENHANCING THE QUALITY OF BLOCK CODED STILL AND VIDEO IMAGES

CROSS-REFERENCE TO RELATED APPLICATIONS

The present invention claims priority from U.S. Provisional Patent Application No. 60/953,265 filed Aug. 1, 2007, entitled "A Filter and its Design Method for Enhancing Picture Quality in Image and Video Coding", which is incorporated herein by reference.

TECHNICAL FIELD

The present invention generally relates to digital processing of still and video images, and more particularly relates to using learning filters for reducing blocking artifacts in decoded still and video images.

BACKGROUND OF THE INVENTION

Many conventional image and video coding standards employ a block-wise approach. For example, the JPEG image coding standard is based on block-wise discrete cosine transform (DCT) and quantization. Similarly, most, if not all, existing so far video coding standards are based on block-wise approach to compression and coding of video images, and utilize block-wise motion compensation (MC), DCT, and quantization. For example, MPEG-1, MPEG-2, H.261, and H.263 use 8×8 blocks of pixels for DCT, while more recent standards H.264 and MPEG-4 AVC may use blocks as small as 4×4 pixels.

As an inherent shortcoming of the block-wise processing and quantization, the block-wise coding approach introduces discontinuities at block boundaries, especially when the quantization level is high. The discontinuities appear as blocking artifacts to which the human visual system is very sensitive.

A recent and improved video coding standard, H.264/AVC, which evolved from previous video coding standards (H.261, H.262, H.263), can achieve the same picture quality as MPEG-2 at about half the bit rate. Currently H.264/AVC has become a component of the new generation of DVD formats and many other applications such as mobile TV. One of its principal features is the integer discrete cosine transform (DCT), operating on blocks of 4×4 or 8×8 pixels. This transform can be computed using integer arithmetic and thus leads to a significant complexity reduction with negligible impact on the picture quality. The transform coefficients are quantized and coded to achieve compression. Quantization is a lossy operation where the amount of information lost depends on the quantization parameter QP which is related to the quantification step size.

Due to this loss of information, blocking artifacts appear at the boundaries of the 4×4 coding blocks. For this reason, H.264/AVC includes an adaptive deblocking filter that is applied to coded image data after block-wise decoding to improve the picture quality. The strength of this deblocking filter depends upon the quantization parameter QP, so that stronger deblocking filtering is used in the case of more coarse quantization. The deblocking filter first detects discontinuities at block boundaries and then determines the appropriate strength for the filter according to QP, the discontinuities, and the coding modes of neighboring blocks. As described in further detail, for example, in I. E. G. Richardson, *H.264 and MPEG-4 Video Compression: Video Coding for Next-generation Multimedia*, John Wiley & Sons, 2003, H.264/AVC utilizes a parameter Bs to indicate the strength of the required filter, with a value ranging from 0 to 4. For instance, Bs=4 means the strongest filter is used whereas Bs=0 indicates that no filtering operation is applied. Accordingly, the deblocking algorithm of H.264/AVC may select from a set of 4 filters of different strength to apply at each particular block boundary.

However, there is still visible distortion after the filtering when compared to the original video. This remaining distortion indicates that the ability of prior art filters to adapt to various cross-block patterns appearing in decoded images is insufficient. Therefore, it is important to find an effective method to reduce the blocking artifacts and improve the picture quality without any significant sacrifice in the compression capability of the coding approach.

Therefore an object of the present invention is to overcome at least some of the shortcomings of the prior art by providing an efficient method and system for adaptive deblocking filtering of decoded still and video images in block-wise image and video encoding.

SUMMARY OF THE INVENTION

Accordingly, one aspect of the invention provides a method for block-wise encoding still or video images that utilizes supervised machine learning at an image encoder to adaptively classify image patterns at coding block boundaries in decoded images in classes of similar patterns and to generate filters that are optimized for the specific classes of image patterns. The method further utilizes an adaptive filter at the image decoder that sorts cross-boundary image patters in the decoded images using the pattern classification rules generated at the encoder, and applies the corresponding class-specific filters obtained from the encoder with the pattern classification rules.

One aspect of the invention provides a method for block-wise encoding still or video images comprising the steps of: a) encoding input image data composed of pixels having original pixel values using a block-wise encoder to obtain encoded image data; b) decoding at least a subset of the encoded image data to obtain a decoded image composed of pixels having decoded image values; c) identifying in the decoded image a plurality of coding block boundaries; d) forming training data comprising a plurality of cross-boundary filter support blocks (CBFSBs), each CBFSB comprising a group of N>1 adjacent pixels of the decoded image including adjacent pixels on both sides of a block boundary; e) generating a set of classification rules based on the training data for classifying each of the CBFSBs into at least one of a plurality of classes, so that each class is adaptively defined by a respective set of the classification rules; f) for each class defined in step (e), generating a set of filter coefficients associated with the class and defining a class-optimized filter that provides a prediction value of a selected CBFSB pixel in dependence upon decoded values of CBFSB pixels based on an original value of the selected CBFSB pixel for each CBFSB in said class; and, g) providing the sets of filter coefficients for each class and the classification rules as an output for subsequent adaptive class-specific and class-optimized filtering of the decoded image data for suppressing blocking artifacts.

A feature of this invention provides a method for block-wise decoding still or video images encoded by the method of claim 1, comprising the steps of: receiving the encoded image data, the set of classification rules for classifying cross-boundary filter support blocks (CBFSB) into at least one of the plurality of classes, and the sets of filter coefficients associated with said classes; decoding the encoded image data with a block-wise decoder to obtain the received image data; identifying a plurality of coding block boundaries in the received image data; for a target pixel in the received image data, performing the steps of: identifying a CBFSB in the received image data that comprises said target pixel and crosses one of the coding block boundaries, classifying said CBFSB into one of the adaptively defined classes using the received set of classification rules, and applying to the identified CBFSB in the received image data the filter coefficients associated with said class to obtain a filtered value of the target pixel.

Another aspect of this invention provides an image encoder for encoding still or video images which comprises a block-wise encoder for generating encoded image data from input image data comprised of pixels having original pixel values using coding blocks having coding block boundaries, a block-wise decoder operatively connected to the block-wise encoder for receiving at least a subset of the encoded image data and for generating therefrom a decoded image comprised of pixels having decoded pixel values, and a training data generator for forming a training dataset comprising a plurality of cross-boundary filter support blocks (CBFSB), each CBFSB comprising a group of N>1 adjacent pixels of the decoded image including adjacent pixels on both sides of a block boundary.

Further features of the image encoder provided by this invention include: a learning classifier operatively connected to the input port and the training data generator for receiving the input image and the corresponding decoded image for generating therefrom a set of classification rules for classifying each of the CBFSBs into at least one of a plurality of classes that are thereby adaptively defined, and at least one set of class-optimized filter coefficients for each adaptively defined class so that filtered values of CBFSB pixels obtained using said filter coefficients approximate original pixel values of respective pixels for all CBFSB associated with said class. A data port coupled to the block encoder and the learning classifier provides the encoded image data, the classification rules and the set at least one set of the class-optimized filter coefficients as an output for subsequent decoding and class-adaptive pixel filtering for reducing blocking artifacts.

Another feature of this invention provides an image decoder for decoding still or video images that have been encoded with the image encoder of claim 16, which comprises a data port for receiving the encoded image data, the classification rules for classifying cross-boundary filter support blocks (CBFSB) into at least one of the classes adaptively defined at the image encoder of claim 16, and the sets of filter coefficients associated with said classes, a block-wise decoder for decoding the encoded image data to obtain the received image data, and an adaptive filter coupled to the block-wise decoder for class-based filtering of target pixels of the received image data.

The adaptive filter comprises a CBFSB sorting section that is configured to identify, for each of the target pixels in the received image data, a CBFSB that comprises said target pixel and crosses a coding block boundary, and to associated said CBFSB with one of the classes using the received set of classification rules. The adaptive filter further includes a filtering section for applying to said CBFSBs one of the sets of the class-optimized filter coefficients according to the class associated therewith.

BRIEF DESCRIPTION OF THE DRAWINGS

The invention will be described in greater detail with reference to the accompanying drawings which represent preferred embodiments thereof, in which like elements are identified with like reference numerals, and wherein:

FIG. 5 is a portion of an ARFF file containing training data for training a learning filter generator;

FIG. 7B is a text representation of the portion of the decision tree shown in FIG. 7A;

DETAILED DESCRIPTION

Figure 1:
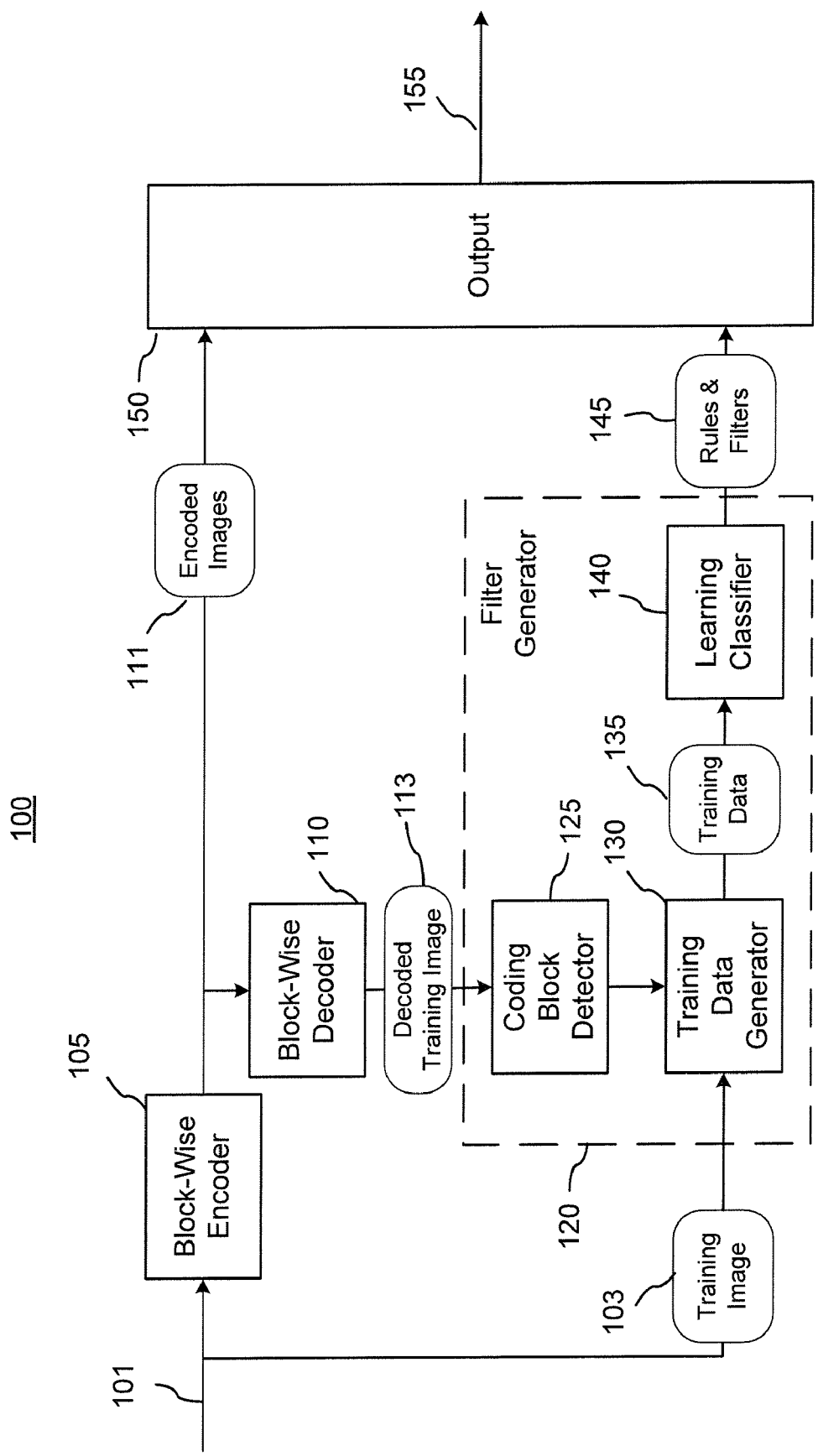
FIG. 1 is a block diagram of an image encoder with a learning filter generator according to the present invention.

In the following the terms "image" and "picture" are used interchangeably, and may refer to a still pixilated image such as a digital photograph or to a frame of a video signal. The term "original image" or "original picture" refer to a pixilated image at an input of a block-wise encoder. The term "original image data" refers to any digital image data at the input of a block-wise encoder comprising pixel values of one or more digital images.

The invention will be described in connection with a number of exemplary embodiments. To facilitate an understanding of the invention, many aspects of the invention are described in terms of sequences of actions to be performed by functional elements of an image processor. It will be recognized that in each of the embodiments, the various actions including those depicted as blocks in flow-chart illustrations and block schemes could be performed by specialized circuits, for example discrete logic gates interconnected to perform a specialized function, by computer program instructions being executed by one or more processors, or by a combination of both. Thus, the various aspects of the invention may be embodied in many different forms, and all such forms are contemplated to be within the scope of the invention.

The present invention provides a method and apparatus for reducing blocking artifacts in block-wise coded still and video images that is based on machine learning techniques. In one aspect of the invention, it provides a continuously adaptable de-blocking filter, which, when applied to video coding, is capable to flexibly adapt itself to changing scenery in video images. The term "continuously adaptable" is used herein to mean the ability to quasi-continuously vary the filer coefficients to adapt to changes in the images, rather than time characteristics. Instead of using a set of pre-defined filter of various strength as conventionally done in the art, the present invention utilizes a supervised learning algorithm to adaptively generate, for a representative picture, a set of optimal filters and related instructions, and then applies these optimal filters after the decoding in accordance with the generated instructions to similar pictures, for example within the same scene in a video sequence as the representative picture, thereby effectively reducing the blocking artifacts. Machine learning algorithms, also referred to as classifiers, are used to analyze the underlying behavior of the block-wise video coding, from which best filtering rules are derived to reduce the coding distortion. The classifiers may be used to analyze a relationship between the distortion of a pixel and the value of adjacent pixels, which enables to construct an adaptive filter that can reduce the coding distortion. Known classifiers such as decision trees, neural networks and genetic algorithms can be used in embodiments of the present invention.

Exemplary embodiments of the apparatus and method of the present invention will now be described with reference to drawings that include block diagrams. In the following description, it will be understood that each block of the block diagrams, and combinations of blocks in the block diagrams, can be implemented by computer program instructions. These computer program instructions may be loaded onto a computer or other programmable apparatus to produce a machine, such that the instructions that execute on the computer or other programmable apparatus create means for implementing the functions specified with reference to the blocks. These computer program instructions may also be stored in a computer-readable memory that can direct a computer or other programmable apparatus to function in a particular manner, such that the instructions stored in the computer-readable memory produce an article of manufacture including instruction means which implement the function specified in relation to the blocks of the block diagrams. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in relation to the blocks of the block diagrams.

Accordingly, blocks of the block diagrams support combinations of means for performing the specified functions and combinations of steps for performing the specified functions. It will also be understood that each block of the block diagrams, and combinations of blocks in the block diagrams, can be implemented by special purpose hardware-based computer systems which perform the specified functions or steps, or combinations of special purpose hardware and computer instructions.

Figure 2:
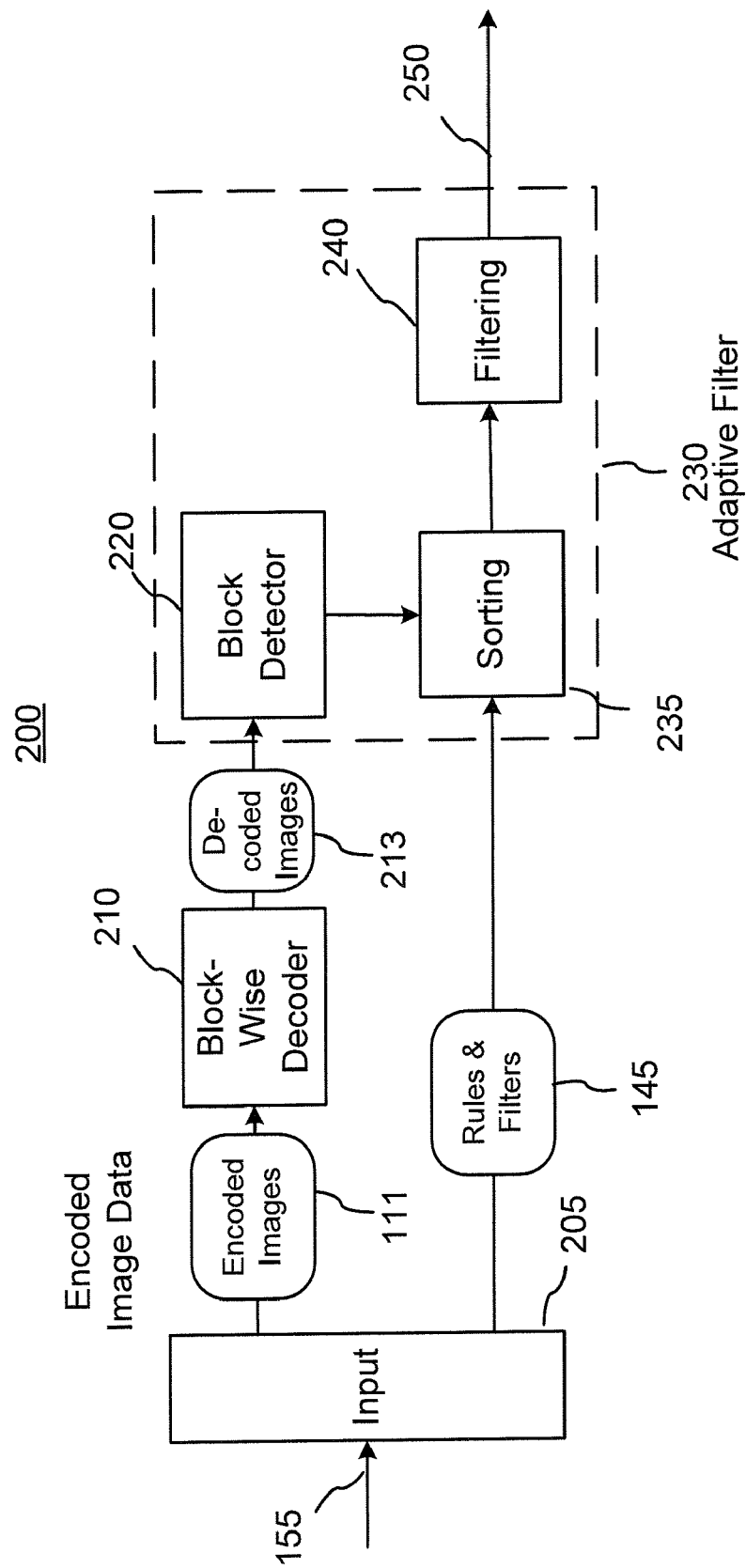
FIG. 2 is a block diagram of an image decoder with a class-based adaptive filter according to the present invention.

FIGS. 1 and 2 schematically show an image encoder 100 and a corresponding image decoder 200, respectively, according to an embodiment of the present invention in the context of a generic image processing system that utilizes a block-wise image encoder 105 and a corresponding block-wise image decoder 210. The various functional units shown as blocks in FIGS. 1 and 2, and also in FIGS. 10-13 showing video encoders 600, 700 and video decoders 650, 750 according to embodiments of the present invention, can be integrated or separate structures implemented in either software or hardware or a combination thereof commonly known to provide their respective functionalities, including general purpose processors, DSPs, ASICs, and FPGAs. The functional units of the image encoders 100, 600, 700, and image decoders 200, 650, 750 are adopted to perform one or several steps of the method of encoding or decoding of the present invention utilizing supervised machine learning to adaptively generate de-blocking filters and filtering rules. These steps will be described hereinbelow with reference to the drawings.

Main aspects of the method and apparatus of the present invention are applicable to decoding both still and video images, and are substantially independent of the particular used block-wise decoder and block-wise encoder, as long as the coding block size is known. The description hereinbelow will be focused on embodiments wherein the block-wise encoder utilize pixel blocks of size 4×4 to compress and encode sequences of video images, for example according to H.264/AVC video compression standard. However, the method described hereinbelow can be applied to coding systems utilizing blocks of pixels of size 8×8, or generally of size N×M, where N and M each equal or greater than 2, with a few modifications that will become apparent to those skilled in the art after reading this specification. The blocks of pixels that the encoder 105 utilizes for image compression and encoding will be referred to hereinbelow as coding blocks (CB), or simply as blocks where it cannot lead to a confusion.

Figure 3:
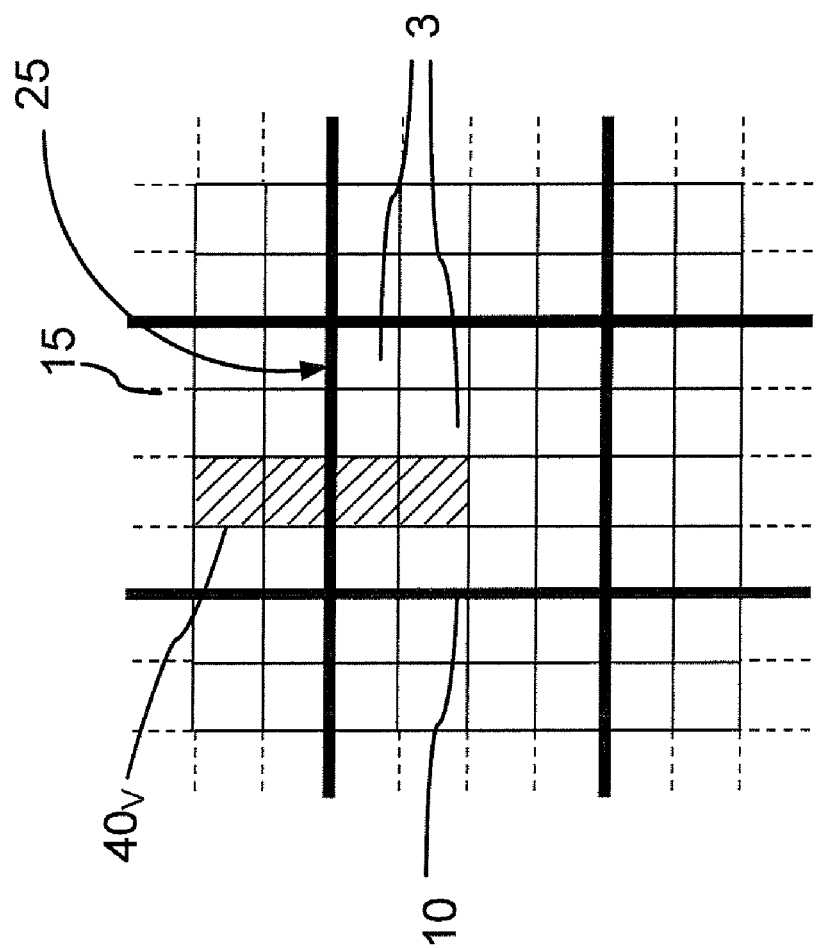
FIG. 3 is a diagram of a 4×4 coding block showing a vertical cross-boundary filter support block.
Figure 4:
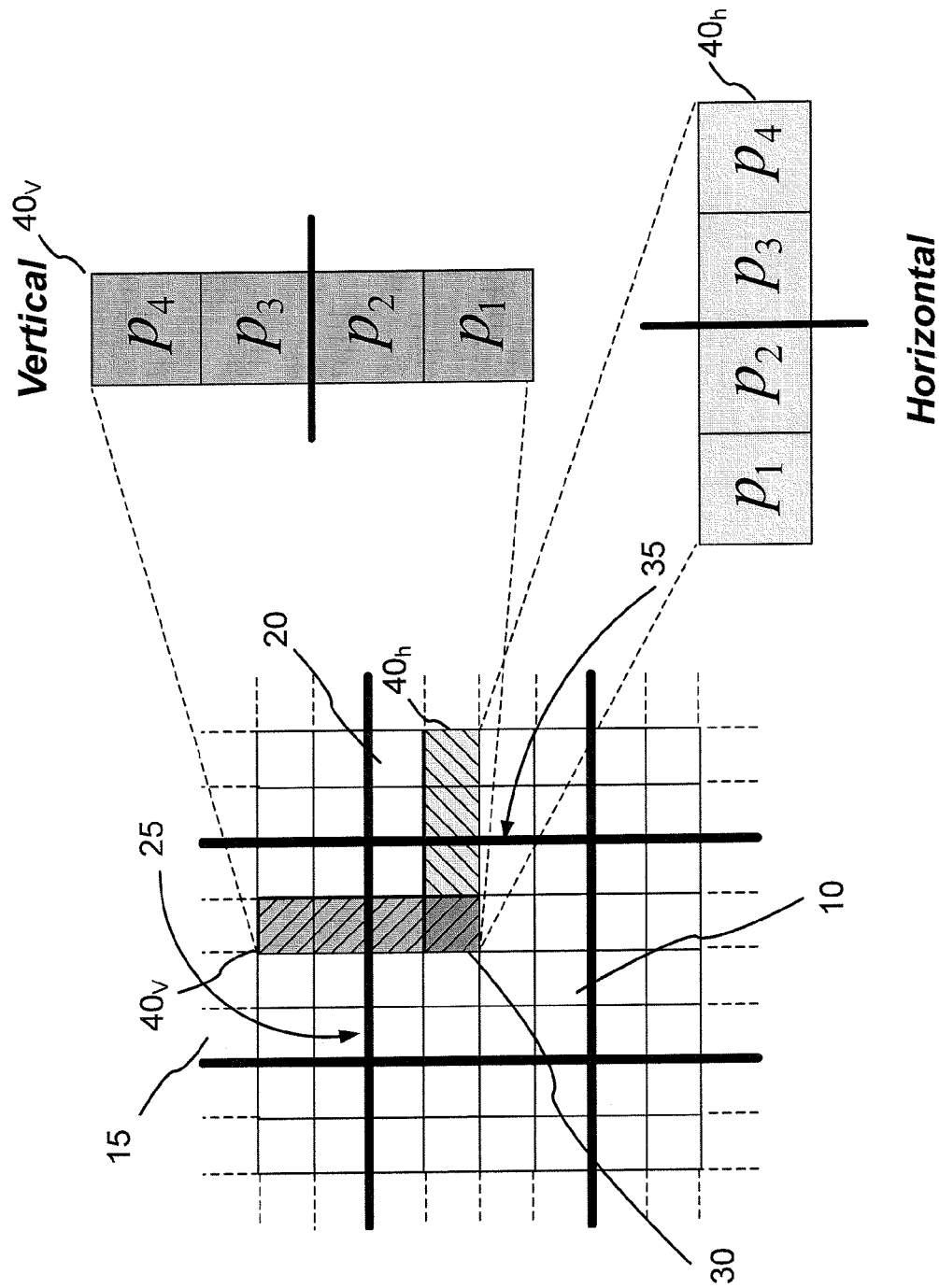
FIG. 4 is a diagram of the 4×4 coding block of FIG. 3 showing vertical and horizontal cross-boundary filter support blocks and corresponding pixel values.

FIG. 3 illustrates a coding block 10 of size 4×4 which is composed of 16 pixels 3 that are shown as small squares, and is adjoined at the sides by 4 other identical in size coding blocks such as block 15. Each pixel 3 has a value associated therewith that may represent an image intensity value at a corresponding location; the plurality of all pixel values is encoded by the block-wise encoder 105 on a block-by-block basis. The coding blocks are separated by block boundaries such as a block boundary 25 that separates coding blocks 10 and 15 and a block boundary 35 that separates coding blocks 10 and 20 as shown in FIG. 4.

According to the invention, an adaptive de-blocking filter is applied to groups of N>1 adjacent pixels in a decoded image that cross coding block boundaries so that each of such groups includes adjacent decoded pixels on both sides of a block boundary. The adaptive de-blocking filter provides a filtered value for one of the pixels of the group, hereinafter referred to as the target pixel, so as to correct for blocking artifacts that appear at the pixel location at or near said boundary. These groups of adjacent pixels are preferably centered about the respective coding block boundary in a decoded image and are referred to hereinafter as cross-boundary filter support blocks (CBFSB), or cross-boundary image slices (CBIS); they represent cross-boundary image patterns that are first classified according to the invention in classes of like patterns, and then adaptively filtered using class-optimized filters. In the embodiment described herein, each CBFSB is a linear sequence of N=4 pixels having two pixels on each side of a block boundary. By way of example, FIG. 3 shows 4 pixels forming a vertical CBFSB $40_v$. In the context of a particular CBFSB, pixels of a decoded image that belong to said CBFSB are referred to herein as CBFSB pixels.

Accordingly, this embodiment of the invention features a one-dimensional (1-D) adaptive filter that takes into account four adjacent pixels across a block boundary to generate a filtered value, which is also referred to herein as the prediction value, for one these four pixels. Each pixel in a 4×4 coding block belongs to two CBFSBs, one that is oriented along pixel rows in the image and is referred to herein as a horizontal CBFSB, and one that is oriented along pixel columns and is referred to herein as a vertical CBFSB. Similarly, filters applied to horizontal CBFSB will be referred to as horizontal filters, while filters applied to vertical CBFSB will be referred to as vertical filters. FIG. 4 shows by way of example a horizontal CBFSB $40_h$ and the vertical CBFSB $40_v$ that share one common pixel 30. In the following we will generally refer to vertical and horizontal CBFSBs such as CBFSBs $40_v$ and $40_h$ as CBFSBs 40; one can see that there are in total sixteen CBFSBs 40 that are associated with each 4×4 coding block, eight horizontal and eight vertical. We will also denote decoded pixel values of the four consecutive adjacent pixels that form a CBFSB 40 as $p_1$, $p_2$, $p_3$ and $p_4$, respectively, as illustrated in FIG. 4, with the understanding that pixel values $p_i$, i=1, 2, 3 or 4, of pixels that belong to two different CBFSB may be different. A filtered value $\tilde{p}_i$ of an i-th pixel within a CBFSB may then be given by an equation $$\tilde{p}_i = a_{ij} \cdot p_1 + b_{ij} \cdot p_2 + c_{ij} \cdot p_3 + d_{ij} \cdot p_4 + K_{ij}. \tag{1}$$

that corresponds to a linear 1D filter that is defined by a set of 5 filter coefficients $a_{ij}$, $b_{ij}$, $c_{ij}$, $d_{ij}$, and $K_{ij}$ that will be denoted hereinafter as $\{fc\}_{i,j} = \{a_{ij}, b_{ij}, c_{ij}, d_{ij}, K_{ij}\}$. In equation (1), the subscript "j" is a filter label that refers to a group of CBFSBs 40 for which the filter is optimized; this group will also be referred to hereinafter as a class.

In one aspect of the invention, the filter coefficients $\{fc\}_{i,j}$ are determined adaptively in operation at the encoding end of the system based on input images using a supervised machine learning algorithm. Generally, machine learning is a subfield of a broader field of artificial intelligence that provides algorithms that are directed to automatically extracting specific information from large datasets or databases using computational and statistical methods. Supervised machine learning is conventionally defined as a technique for automatically learning a function from training data. The training data consist of pairs of input objects, for example vectors, and desired outputs. The task of the supervised learner, or classifier, is to predict the value of the function for any valid input object after having seen a number of training examples, i.e. pairs of input and target output.

The current invention utilizes a supervised learning classifier to first analyze cross-boundary patterns in a representative training picture or pictures after decoding, and to generate rules for classifying such patterns into groups of similarly matching patterns; these rules govern how the adaptable filtering of the present invention is performed and are referred to herein as classification rules or filtering rules. A class-optimized filter is then generated for each of the groups by determining, for example using known techniques of data modeling such as multivariate regression, which may involve data or error averaging, a set of filter coefficient that provides a prediction pixel value that approximates an original value of the pixel prior to the block-wise encoding for all patterns in the respective group (class). These classification rules, together with the associated sets of filter coefficients, are then provided to an image receiver, or stored together with the encoded image data, for subsequent decoding and class-based adaptive filtering. The invention therefore provides de-blocking filtering that is substantially continuously adapts to changing image patterns both in time, i.e. from frame to frame in a video sequence, and locally across each particular image, i.e. which is both locally and temporally adaptable.

This process will now be further described with reference to the encoder 100 and decoder 200 shown in FIGS. 1 and 2. Turning first to FIG. 1, the block-wise encoder 105, which in operation receives original image data 101, is operatively connected at its output to a multiplexing output data port (MUX) 150 and to a block-wise decoder 110, which in turn connects to a learning filter generator (LFG) 120. LFG 120 includes an optional coding block detector (CBD) 125 that is operatively connected to the block-wise decoder 110, a training data generator (TDG) 130, and a learning classifier (LC) 140, which are connected in series. An output of the LC 140 operatively connects to the MUX 150. Turning now to FIG. 2, the image decoder 200 includes an input de-multiplexing data port (DMUX) 205, a block-wise decoder 210, and an adaptive filter 230, which includes an optional CBD 220, a sorting section 235, and a filtering section 240 connected in series. The DMUX 205 has an input port and two output ports that are coupled to the block-wise decoder 210 and the adaptive filter 230, respectively. An output of the block-wise decoder 210 also operatively connects to the adaptive filter 230. The LFG 120 and the adaptive filter 230 in combination form a learning de-blocking filter according to the present invention.

Turning now back to FIG. 1, in operation the block-wise encoder 105 receives input image data 101 composed of pixels having original pixel values that we will generally denote p°, and generates therefrom encoded image data 111, which are provided to the MUX 150. At least a subset of the encoded image data is provided to a block-wise decoder 110 for block-wise decoding so as to obtain a decoded training image 113, which is composed of pixels having decoded image values that we will generally denote p. The decoded training image 113 is passed to the LFG 120 where it is received by the CBD 125, which identifies in the decoded image 113 a plurality of coding block boundaries. Information about the identified block boundaries is passed to the training data generator 130 together with the decoded image data, which breaks down the decoded image 113 into a plurality of cross-boundary filter support blocks (CBFSB) such as the CBFSB 40, and forms a therefrom training data 135. The training data 135 is then passed to the learning classifier 140 that analyzes it and, on the basis of this analysis, generates classification rules for classifying the CBFSBs into a plurality of classes that are adaptively defined by the classification rules. For each such adaptively defined class, the learning classifier 140 computes a set of class-optimized filter coefficients that is optimized for those CBFSBs from the training data 135 that are associated with the respective class, so that the prediction values of CBFSB pixels obtained using said filter coefficients suitably approximate original values of respective pixels for all CBFSBs associated with said class. The finding of the class-optimized set of filter coefficients may be done by known in the art methods of data analysis such as regression, and may include selecting a set of filter coefficients that minimizes or maximizes a merit function defined for a class. Different merit functions that can be used here are known in the art. By way of example, computing a merit function may involve computing a difference between the prediction value $\tilde{p}_i$ given by the filter and the original pixel value $p°_i$ to determine a prediction error e for each CBFSB 40 of a class, and may further involve summing up squares of the prediction errors e for all CBFSB in the class to obtain a class-average predication error as the merit function to be minimized.

The formation of the training data 135 will now be described in further detail in one embodiment of the method.

Training Data

The training data 135 may be formed from representative pictures in order to extract relevant and discriminating classification rules and filter coefficients. For example, the training process that the LC 140 implements may be performed for every scene in a video sequence, or periodically after a predetermined number of frames. In one embodiment, the training data generator 130 receives the original input image data 101 and selects therefrom within the scene a subset of image data 103 containing a representative original picture or a portion thereof, which is referred to hereinafter as the original training image 103. The subset 113 of the decoded image data contains the decoded training image and is also referred to hereinafter as the decoded training image 113. The TDG 130 extracts pixel information from the original and decoded training images 103, 113 to create the training data 135. In one embodiment, the TDG 130, using the information about the coding block boundaries in the decoded training picture obtained from the CBD 125 or directly from the decoder 110, groups together every four horizontally or vertically adjacent pixels in the decoded training image 113 that have two pixels on each side of a block boundary, to form the plurality of CBFSB 40 corresponding to the decoded training image 113; each such CBFSB 40 may be represented as a vector v of size N as shown in FIG. 1, having as elements pixel values $p_i$, i=1, . . . , 4, of the CBFSB pixels, which are also referred to herein as (independent) attributes:

$$v=[p_1, p_2, p_3, p_4] \quad (2)$$

In some embodiment, the information about coding block boundaries may be provided to the TDG 130 directly from the block-wise decoder 110, and the CBD 125 maybe omitted.

In accordance with general principles of supervised machine learning, the training data 135 also includes original pixel values $p^o_i$ for each CBFSB 40 included in the training data 135; the notation $p^o_i$, i=1, 2, 3, or 4, refers to the original pixel value of an i-th pixel in a particular CBFSB 40, which is extracted from the original training image 103 by the TDG 130. The original pixel values $p^o_i$ of pixels of the training image 103 will be referred to herein as dependent attributes.

In one embodiment of the invention, the training data 135 may include a plurality of training records, or instances, each instance I composed of a particular CBFSB vector v and its counterpart $v_o$ from the original training image:

$$I=[v, v_o] \quad (3)$$

where $$v_o=[p^o_1, p^o_2, p^o_3, p^o_4] \quad (4)$$

is a vector composed of original pixel values of the CBFSB vector v. The training data 135 is composed of a plurality of the instances I obtained from the training image, each formed by 2N=8 pixel values, or four independent attributes $p_i$ and for dependent attributes $p^o_i$. For a picture in QCIF format, there may be in total 6,192 horizontal instances, and the same number of vertical instances.

By way of example, FIG. 5 shows the training data 135 in the form of an ARFF file that is used in a suite of machine learning software "WEKA", which is available free under the GNU General Public License from the University of Waikato, New Zealand. Further details about the ARFF file format and the application of WEKA software in embodiments of the present invention are provided in APPENDIX 1 hereinbelow. As the training data 135 contains the pixel values from both the original training image 103 and the corresponding decoded training image 113, the resulting classification rules and the associated filter coefficients $\{cf\}_{i,j}$ are adapted to patterns of pixel distortion that are present in the training image and, to some extent, to other related images, for example to other images from the same scene in a video sequence; accordingly, filters generated by the LFG 120 were found to significantly reduce compression-induced distortions in the decoded images.

The training process in the LC 140 for the vertical filter is the same as the horizontal except that each instance consists of two vectors of four vertically adjacent pixels across a horizontal block boundary. In embodiments utilizing the quantization parameter QP and alike in video encoding, the training data 135 may be created for a certain value of the quantization parameter and for a particular scene in the video sequence. The classification rules and filter coefficients $\{cf\}_{i,j}$ generated by the LC 140 may change if another quantization parameter value is used and/or if there is a scene change. The accuracy of the generated classification rules may progressively decrease in the scene as the distance, i.e. number of intermediate pictures or video frames, between the picture/frame to be filtered and the training image increases. Generally, the larger is the size of the training data 135, the more accurate may be the generated filters.

As each CBFSB 40 consists of N=4 pixels, there may be at least N=4 filters associated with each CBFSB, each filter providing a filtered, or prediction, value for one of the CBFSB pixels in accordance with equation (1), and therefore N=4 sets of classification rules for those filters, provided that the LC 140 does not differentiate between vertical and horizontal filters. In other embodiments, the LC 140 may generate the classification rules and associated filter coefficients $\{fc\}_{i,j}$ separately for vertical and horizontal filters, resulting in 2N=8 sets of rules and filter coefficients. We will now describe the generation of the classification rules and associated filter coefficients $\{fc\}_{i,j}$ for an i-th pixel position in a CBFSB, where i=1, 2, 3, or 4, in one embodiment of the invention.

First, the LC 140 extracts from the received training data 135 a training dataset $\{TE\}_i$ composed of a plurality of training examples TE, where each training example TE may be represented as a vector or an array of size (N+1):

$$TE=[v, p^o_i]=[p_1, p_2, p_3, p_4, p^o_i] \quad (5)$$

where $p^o_i$ is the original pixel value of one of the decoded pixels $p_1, p_2, p_3$, or $p_4$, for example by parsing removing from each instance I and removing therefrom all original pixel values but one. Each such training example includes one CBFSB from the decoded training image 113 and an original pixel value of one of the CBFSB pixels, or four independent and one dependent attributes.

The goal is to find a set of filter coefficients with the filtering model of the form given by equation (1) that predicts the original pixel values $p^o_i$ with a suitably small prediction error $e=|\hat{p}_i-p^o_i|$ for a group, or class, of CBFSB satisfying certain classification rules, and to find an optimal set of classification rules that provides suitably small filtering errors for a suitably small number of classes.

The inventors recognized that this is a task of supervised machine learning, and therefore it can be performed using known machine learning algorithms. The inventors have investigated several of known algorithms, or classifiers, of supervised machine learning using the WEKA software suite, including the linear regression classifier, the RepTree classifier, the M5' classifier, and the multilayer perception classifier, and found that each of them can be utilized to generate filters that enhance the quality of block-wise coded video images. The linear regression classifier extracts one linear model for the entire database. It reflects well any linear tendency of the data. M5' is a model tree inducer in which each leaf contains a linear model. The RepTree classifier is a regression tree classifier where each leaf represents the average value of attributes (or entries) that reach the leaf. The multilayer perception classifier may be a simple neural network with one or more hidden layers. Result of these investigations are published in a paper by the inventors of the present invention, G. Huchet, J.-Y Chouinard, D. Wang and A. Vincent. <<Decision Tree for Denoising in H.264/AVC Video Sequences>>, Visual Communication and Image Processing Conference (VCIP), San-Jose, Calif., USA, 2008, which is incorporated herein by reference.

Figure 6:
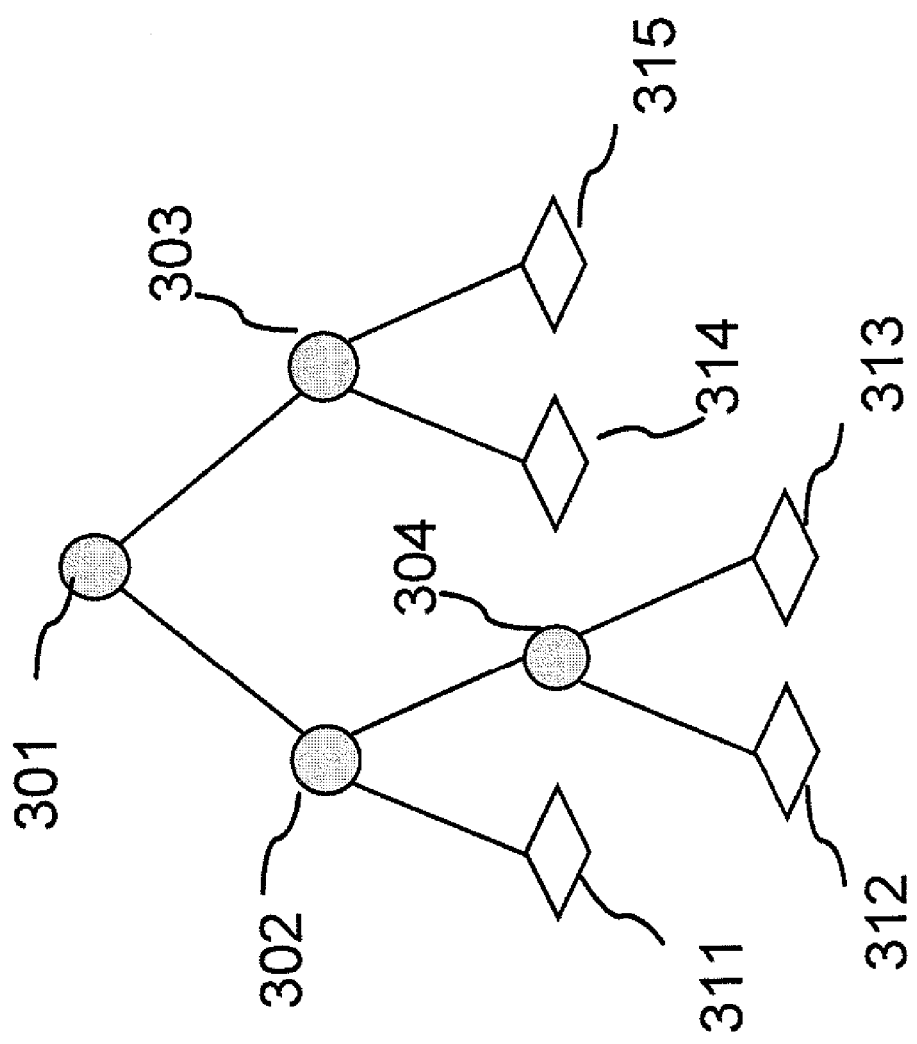
FIG. 6 is a diagram of a simple decision tree.

Hereinbelow we will describe an embodiment of the method of the present invention wherein the LC 140 utilizes an iterative partitioning algorithm such as M5 or M5' (M5 prime); the M5' algorithm, as well as its original version M5, is decision tree inducer that obtains the classification rules for CBFSB 40 in the form of a decision tree. By way of example, FIG. 6 shows a simple decision tree having four nodes and five leafs, wherein each node 301-304 corresponds to a test applied to one or several of independent attributes, in the current embodiment—one or several of $p_1$, $p_2$, $p_3$, or $p_4$, each branch 321 corresponds to a decision made with respect to the corresponding attribute or attributes, and each leaf 311-315 represents a regression model, namely—a set o filter coefficients {fc} that is optimized for a subset, or class, of CBFSBs 40 from the training data 135 with the attributes satisfying all the decisions taken along branches leading up from the respective leaf, i.e. with a filter that suitably fits (predicts) all the original pixel values $p°_i$ corresponding to said class, i.e. subset, of the CBFSB. A test used at each node is a splitting criterion that minimizes the intra-subset variation in the class values down each branch.

In the embodiment utilizing the M5' algorithm, the LC 140 builds a decision tree for an i-th training dataset $\{TE\}_i$ by iteratively splitting said dataset into subsets, or classes, testing the values of the attributes of the TEs to make routing decisions at the nodes. For example, at each node a dataset that reaches that node is split in two subsets using a test wherein an independent attribute $p_j$, j=1, 2, 3, or 4, of each CBFSB 40 that reached said node is compared with a threshold s, and associating all training examples with $p_j \leq s$ with a first subset, and all others—with a second subset. The decision tree is created in three steps: (i) building an initial tree, (ii) pruning the initial trees, and (iii) smoothing the pruned tree. These steps are described in articles [1] Y. Wang and I. H. Witten, Inducing Model Trees for Continuous Classes, Proceedings of the Poster Papers of the European Conference on Machine Learning, University of Economics, Faculty of Informatics and Statistics, Prague, 1997; and, [2] J. R. Quinlan, Learning with Continuous Classes. Proceedings 5th Australian Joint Conference on Artificial Intelligence, World Scientific, Singapore, 1992, both of which are incorporated herein by reference. The aim is to construct a filter (1) that predicts the original pixel values $p_i°$ from the set of decoded pixel values $\{p_1, p_2, p_3, p_4\}$ associated with the same CBFSB in the training dataset $\{TE\}$. These steps are briefly described hereinbelow, with further details available from the articles [1] and [2] cited hereinabove.

Building the initial tree can be described by considering what happens at each node, as follows. Suppose that the training dataset that reaches a node consists of a set T of the training examples TE; at the root, T coincides with $\{TE\}_i$. The standard deviation sd(T) of class values in all the training set T is first computed. Then the training set T is split into 2 subsets $T_{s,0}$ and $T_{s,1}$ by comparing $p_i$ of each training example TE from the set T with a threshold s. After that, the standard deviations sd($T_{s,0}$) and sd($T_{s,1}$) for the subsets $T_{s,0}$ and $T_{s,1}$ are computed, and the expected error reduction is calculated as the standard deviation reduction SDR using equation (6):

$$SDR(p_i, s) = sd(T) - \frac{|T_{s,0}|}{|T|} \times sd(T_{s,0}) - \frac{|T_{s,1}|}{|T|} \times sd(T_{s,1}) \quad (6)$$

where |T| stands for the number of instances in the set T, and similarly for the subsets $T_0$ and $T_1$. A different value s of the threshold leads to a different split. The M5' algorithm computes the SDR value for every possible value s and each of the attributes $p_i$, and chooses the split that provides the maximum SDR. The splitting process continues for each of the subsets until the standard deviation of a subset is very small, for example less than 5% of sd($\{TE\}_i$), or there are only a few training examples in the subset, for example 4 or less.

A variety of splitting criteria, also referred to herein as classification criteria, can be used for splitting the datasets at the nodes, examples of which include the maximization of the standard deviation reduction, the absolute difference reduction, and the variance reduction of a selected splitting parameter within a group of training examples, for example of the class values. In one embodiment, the standard deviation sd(T) which reduction is maximized at each node may be computed as the standard deviation of the original pixel values $p°_i$ of all TEs in the dataset T, i.e. sd(T)=sd($p°_i \in T$), where $$sd(p_i^0 \in T) = \frac{1}{|T|} \sum_T (p_i^0 - \langle p_i^0 \rangle)^2.$$

In another embodiments, the splitting criterion is the maximization of the SDR parameter give by equation (6), but with the "standard deviation" sd(T) computed based on the prediction errors for the set, using temporary node-specific linear models constructed for the set T to determine the prediction values for the datasets at the nodes:

$$sd(p_i^0 \in T) = \frac{1}{|T|} \sum_T (p_i^0 - \tilde{p}_i)^2$$

Once the splitting process terminates, a "best" set of filter coefficients $a_i$, $b_i$, $c_i$, and $K_i$ is computed for each resulting subset of the training data that suitably minimizes the prediction errors e for each TE from the respective subset, for example using the well-known multivariate regression technique.

The initial tree may have too many nodes and leaves, and if it does, it may be pruned. First, a multivariate linear model of the type given by equation (1) is constructed at each node of the initial tree using a linear regression. The linear model is first calculated with the independent attributes that reach the node, and the linear model is simplified to try to reduce the prediction error of the model. Finally, the tree is pruned from the bottom leaves to reduce the error.

A smoothing process may be used to attenuate the discontinuities between adjacent linear models for the leaves. This process is described in detail in ref. [2] and may increase the accuracy of filtering models.

FIG. 7 illustrates by way of example a portion of a final decision tree 400 generated by the LC 140 as described hereinabove for an exemplary training image. A training dataset $T_{401}$ of training examples TE is progressively split at successive nodes 401-404 with respect to values of the first attribute $p_1$ using a sequence of threshold values 175.5, 212.5, 226.5, and 219.5 that have been obtained based on the selected splitting criterion. More specifically, the training dataset $T_{401}$ that reaches node 410 is first split into two subsets, with a first subset includes all TEs from T including CBFSB with $p_1 \leq 175.5$, and a second subset $T_{402}$ includes all TEs from $T_{401}$ with CBFSB having $p_1 > 175.5$. The second subset $T_{402}$ is then split at node 402 into smaller third and forth subsets, with the third subset includes all TEs from the second subset $T_{402}$ with CBFSB having p1≦212.5, and the forth subset $T_{403}$ includes all TEs from the second subset $T_{402}$ with CBFSB having p1>212.5. At node 404, a subset $T_{404}$ that reaches it is split in two smaller subsets, and for one of them which includes TEs with p1 between 212.5 and 219.5 the splitting stops, and a leaf 411 is reached; this subset forms a class $T_{23}$, for which a set of best filter coefficients $\{fc\}_{23}$ is computed using linear regression that minimizes the prediction error $$e=|\tilde{p}_i - p_i^o| \qquad (7)$$

for the class $T_{23}$; this set of filter coefficients, also referred to as linear model, is assigned a label LM23.

The remainder of the subset $T_{404}$ can be denoted $T_{405}$ and has $p_1$ between 226.5 and 219.5; it is split at node 405 with respect to the third attribute $p_3$, by comparing the value of $p_3$ in each CBFSB that reaches the node 405 to a threshold value 215.5; TEs with CBFSB having $p_3$ greater than 215.5 form another class T27, and a corresponding set of filter coefficients represented by a leaf 412 is assigned a label LM27. The remainder T406 of the subset T405, a subset T406, is split at node 406 again with respect to p3 using a threshold value 184.5, forming a class T24 with an associated linear model $\{cf\}_{24}$ labeled LM24 at leaf 413. Finally, the remainder T407 of the subset T406 is split at node 407 with respect to $p_2$ by comparing $p_2$ to a threshold value 216.5 into two classes having associated linear models $\{fc\}$ labeled LM25 and LM26.

The decision tree 400 is a visual representation of a set of classification rules that is associated with filtering of one of the CBFSB pixels, for example corresponding to the first pixel position in a CBFSB, $p_1$. In the following, we will refer to the set of classification rules represented by the tree 400 as the set of classification rules 400. It can also be presented as text, i.e. a sequence of ASCII characters, and then coded into a string of binary data using known coding algorithms for text coding. FIG. 7B provides an exemplary text representation 400*t* of the set of classification rules corresponding to the decision tree 400; APPENDIX 2 provides another example of a text representation of a decision tree using less characters.

The supervised learning algorithm for obtaining the classification rules and the associated sets of filter coefficients such as that described hereinabove may be executed by the LC 140 several times, at least ones for each target CBFSB pixel position i. In the embodiment described herein, the LC 140 does not differentiate between vertical and horizontal CBFSB, so that the tree building process is performed N=4 times. This results in N=4 sets of classification rules, with each set of rules associated with and accompanied by its own set of filter coefficients. In another embodiment, the tree building algorithm may be executed separately in the vertical and horizontal directions, or twice for each pixel position in an CBFSB 40. This results in 2N=8 sets of classification rules.

A cumulative set of classification rules and filter coefficients 145 generated by the LC 140 as described hereinabove, which is hereinafter referred to as the rules and filter (R&F) data 145, is comprised of the sets of classification rules and associated sets of filter coefficients for each target CBFSB pixel location. Once generated, the R&F data is provided to the MUX 150, which multiplexes it in a binary format with the encoded image data 111, which may include the encoded training image and an adjacent sequence of images from the same scene. The MUX 150 provides the resulting multiplexed coded image and filter data 155 as a binary data sequence to a target recipient; for example, it may be transmitted via a wireless or wired communication link to the image decoder 200, or may be passed for storing in a memory device such as a computer hard disk, an optical disk such as a CD or DVD, magnetic memory device, or other suitable data storage device.

Image Decoder

The operation of the image decoder 200 for decoding block-wise coded still or video images in one embodiment of the present invention will now be described.

Referring back to FIG. 2, the multiplexed block-coded image and filter data 155 generated by the encoder 100 is received by the DMUX 155, which de-multiplexes them into the encoded image data 111 and the R&F data 145. The encoded image data 111 is provided to the block-wise decoder 210 for block-wise decoding and generating therefrom received image data 213 comprised of a sequence of decoded images that have similar visual patterns as the decoded training image 113, and may include it. The received image data 213 and the R&F data 145 are provided to the adaptive filter 230 for class-based filtering of target pixels of the decoded images in the received image data 213. Which pixels of the received image data are selected as the target pixels for filtering may depend on a particular embodiment, for example on the size of the coding block. In the embodiments described herein utilizing 4×4 coding blocks, each pixel of a coding block may be targeted for filtering. In embodiments with larger coding blocks, pixels that are more than a few pixels away from a nearest block boundary may be excluded from filtering. Information regarding which pixels to select as target pixels for filtering is shared between the encoder 100 and the decoder 200; it may be stored in memory of the decoder 200, or provided to the decoder 200 from the encoder 100, or may be otherwise known to the adaptive filter 230.

In some embodiments, the received image data 213 is provided first to the CBD 220 for identifying coding block boundaries in the received image data 213, and then—to the CBFSB sorting section 235. In other embodiments where required information about the block boundaries is available from the block-wise decoder 210, the CBD 220 may be omitted. The CBFSB sorting section 235 is configured, e.g. programmed with a suitable set of processor instructions, to identify for each of the target pixels in the received image data 213 at least one CBFSB that comprises said target pixel and crosses one of the identified coding block boundaries, and to classify said CBFSB into one of the adaptively defined classes using the received set of classification rules that is contained in the R&F data 145. As described hereinabove with reference to the LC 140, the classification rules may include sequences of threshold values associated with CBFSB pixel positions; they may also include ranges of pixel values for each CBFSB pixel positions that a CBFSB has to satisfy to be classified into a particular class. The classification rules may also include associated labels pointing to the sets of filter coefficients $\{fc\}_{i,j}$ associated with respective classes.

At the output of the CBFSB sorting section 235, each target pixel in the received image data 213 is associated with a filter defined by one of the sets of class-optimized filter coefficients $\{fc\}_{i,j}$ received with the R&F data 145, and which is adapted to the corresponding CBFSB class. From the CBFSB sorting section 235, the received image data is provided to the filtering section for class-optimized filtering of the target pixels by applying to each of the CBFSBs 40 identified in the received image data 213 one of the sets of class-optimized filter coefficients $\{fc\}_{i,j}$ that is associated with the respective class.

Figure 8:
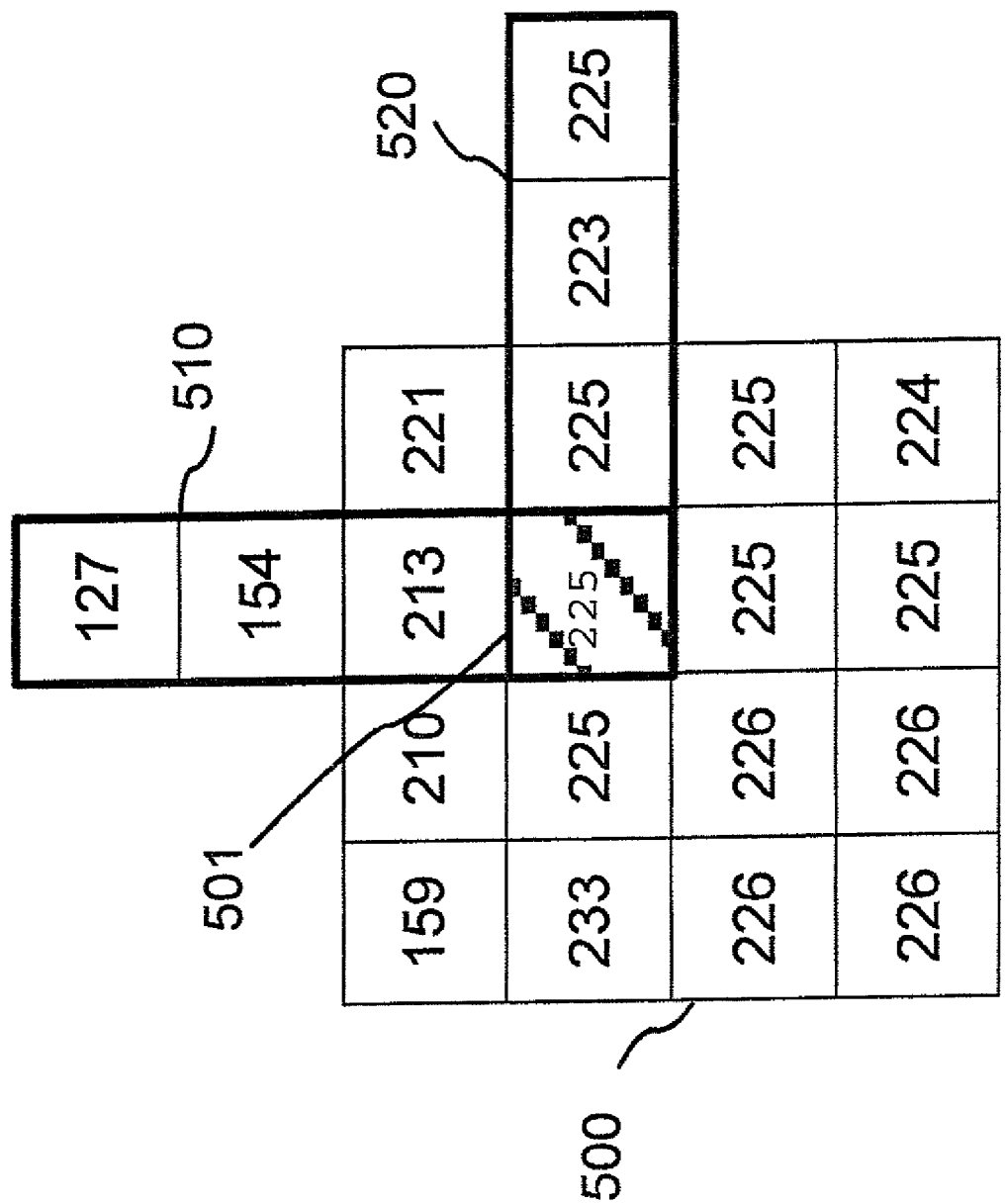
FIG. 8 is a schematic diagram of one coding block in a decoded image showing two CBFSB sharing a target pixel.

With reference to FIG. 8 showing a coding block 500 in the received image data 213, in one embodiment the afore-described class-based filtering process may include the steps of:

i) identifying boundaries of the coding block 500;

ii) selecting a target pixel 501 within the coding block 500 for filtering; this pixel may be identified by the block number l and the pixel row and column indices within the block m and n, so that in the shown example the pixel 501 can be denoted as p(l,m,n)=p(l,2,3);

iii) identifying a first CBFSB 510 of size N=4 that includes the target pixel 501 and crosses a first nearest block boundary 525;

iii) identifying a second CBFSB 520 of size N=4 that includes the target pixel 501, and crosses a second nearest block boundary 535; in the shown example the target pixel p(l,m,n) is at the first CBFSB pixel location for each of the CBFSB 510 and 520, so that $p_1$=p(l,2,3) for each of the CBFSB 510 and 520;

iv) receiving R&F data 145 containing the set of classification rules for classifying a CBFSB into one of the plurality of adaptively defined classes and the associated sets of class-optimized filter coefficients;

v) classifying the first CBFSB 510 into one of the adaptively defined classes using the received classification rules, and selecting a first set of filter coefficients $\{fc\}_{i1,k1}$ associated therewith from the received sets of class-optimized filter coefficients; here the subscripts i1 and k1 are an index of the pixel position of the target pixel 501 in the first CBFSB 510, and a class label for the class to which the first CBFSB has been classified, respectively; other embodiments may also differentiate between vertical and horizontal filters; in the shown example i1=1;

vi) applying the first set of filter coefficients $\{fc\}_{i1,k1}$ to the first CBFSB 510 to obtain a first filtered pixel value $\tilde{p}_{i1}^V$ for the target pixel 501;

vii) classifying the second CBFSB 510 into one of the adaptively defined classes using the received classification rules, and selecting a second set of filter coefficients $\{fc\}_{i2,k2}$ associated therewith from the received sets of class-optimized filter coefficients, wherein the subscripts i2 and k2 refer to an index of the pixel position of the target pixel 501 in the second CBFSB 520, and a class label for the identified CBFSB class, respectively; in the shown example i2=1;

viii) applying the second set of filter coefficients $\{fc\}_{i2,k2}$ to the second CBFSB 520 to obtain a second filtered pixel value $\tilde{p}_{i2}^H$ for the target pixel 501;

ix) averaging the first and second filtered pixel values to obtain a new filtered value $\tilde{p}_{i1,i2}$ of the target pixel.

By way of example, the first CBFSB 510 is vertical and is formed by pixel with pixel values $p_1$=225, $p_2$=213, $p_3$=154, $p_4$=127, and the second CBFSB 520 is horizontal formed by pixel with pixel values $p_1$=225, $p_2$=225, $p_3$=223, $p_4$=225. The target pixel 501 to be filtered is the first pixel $p_1$ in both the vertical 525 and horizontal 535 CBFSB, so that i1=i2=1, and $\tilde{p}_{i1,i2}$=$\tilde{p}_{1,1}$. Therefore in the embodiment wherein vertical and horizontal filters are classified within the same classes, both the first CBFSB 525 and the second CBFSB 535 are classified using the first set of classification rules 400 shown in FIG. 7A as the decision tree and in FIG. 7B as text.

Figure 7A:
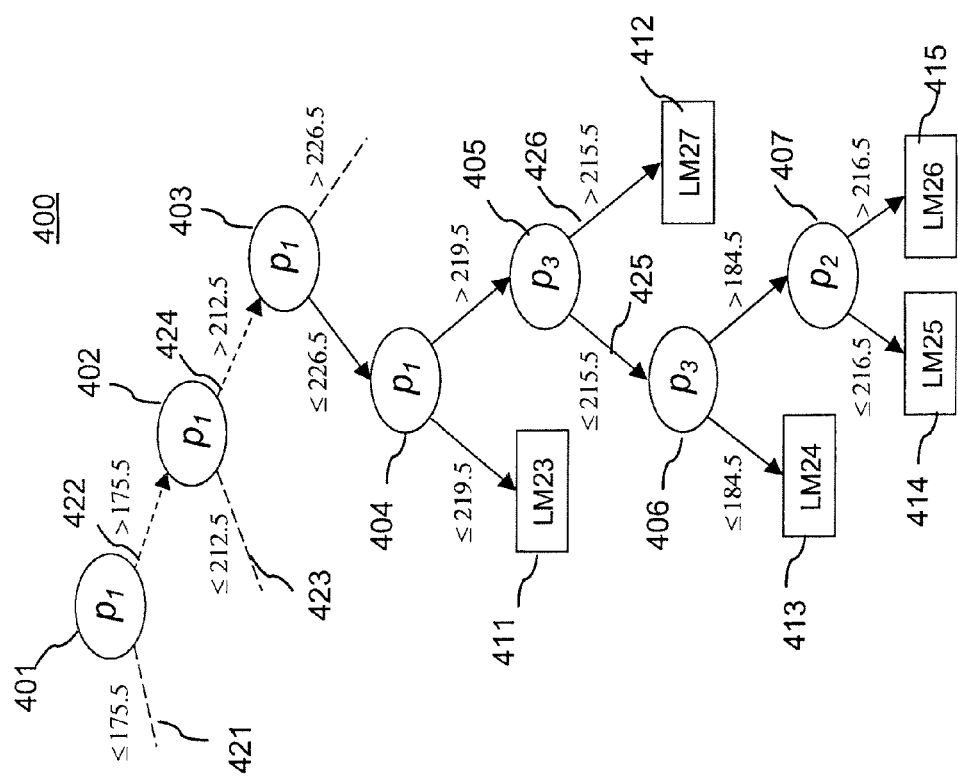
FIG. 7A is a diagram of a portion of a decision tree generated using the M5' algorithm for filtering a first CBFSB pixel using an exemplary training image.
Figure 7B:
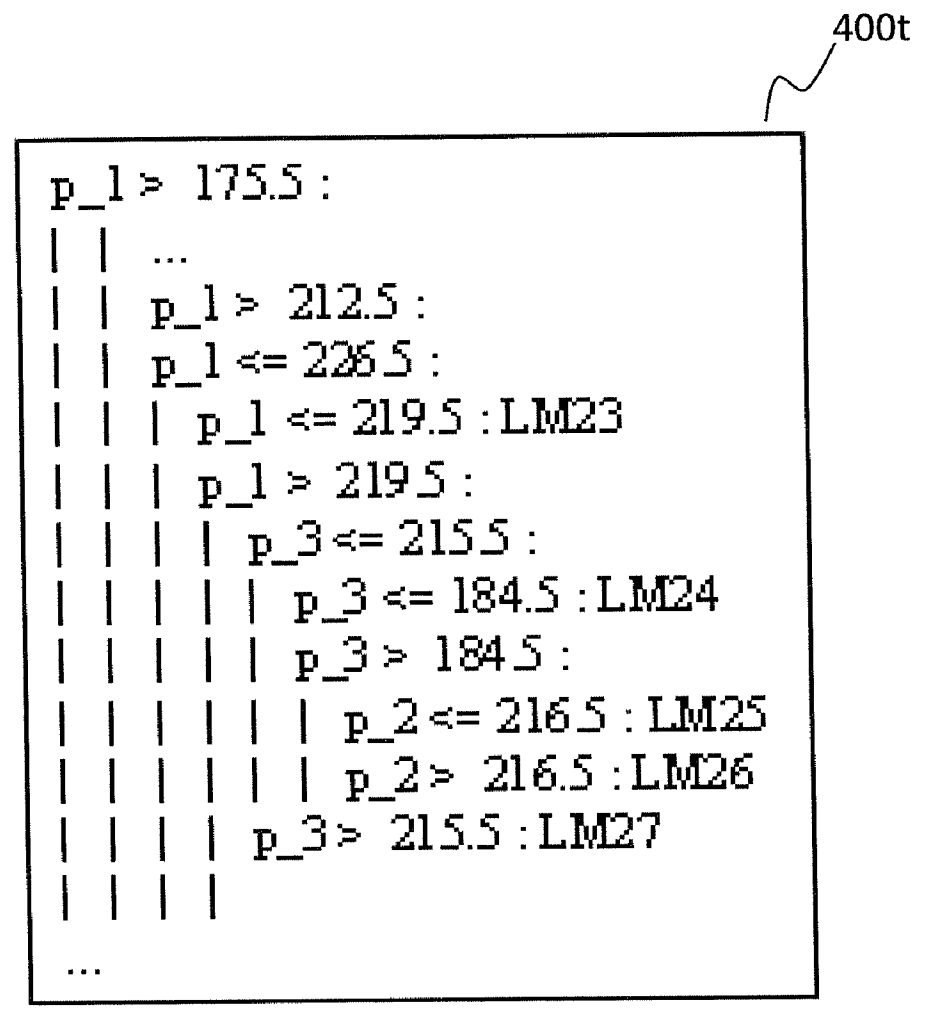

Assuming further by way of example that the shown portion of the classification rules corresponds to the top portion of the decision tree, the sorter 235, which is programmed to process the CBFSB 520 according to the received set of classification rules 400, first sequentially tests the $p_1$ of the CBFSB 520 with respect to the threshold values 175.5, 212.5, 226.5, 219.5, then compares $p_3$ to a threshold values 215.5 and assigns the pixel 501 a class label LM27, at each step executing respective instructions contained in the classification rules 400, as represented by branches 422, 424, . . . , 426 of the decision tree of FIG. 7A, and as coded in the line sequence of FIG. 7B. Similarly, the sorter 235 processes the pixel values of the vertical CBFSB 525 using the received classification rules 400 and determines that its class label is LM 24.

Accordingly, the filtering section selects the set of filter coefficients associated with the label LM 27 for the horizontal filtering of the target pixel $p_1$ 501, and the set of filter coefficients associated with the label LM 24 for the vertical filtering thereof, and performs both filtering using the respective sets of filter coefficients as described by the following equations (9) and (10):

$$\tilde{p}_1^H = 0.6283\, p_1 + 0.1114\, p_2 - 0.0039\, p_3 + 0.0027\, p_4 + 58.7864 \quad (9)$$

$$\tilde{p}_1^V = 0.1338\, p_1 - 0.1166\, p_2 - 0.0263\, p_3 + 0.1131\, p_4 + 206.1226 \quad (10)$$

The final new pixel value $\tilde{p}(l,2,3)$ of the target pixel 501 p(l,m,n)=p(l,2,3) is given by the average of the vertical $\tilde{p}_1^V$ and horizontal $\tilde{p}_1^H$ filtering results:

$$\tilde{p}(l,2,3) = 0.5(\tilde{p}_1^V + \tilde{p}_1^H) = 223 \quad (11)$$

Figure 9:
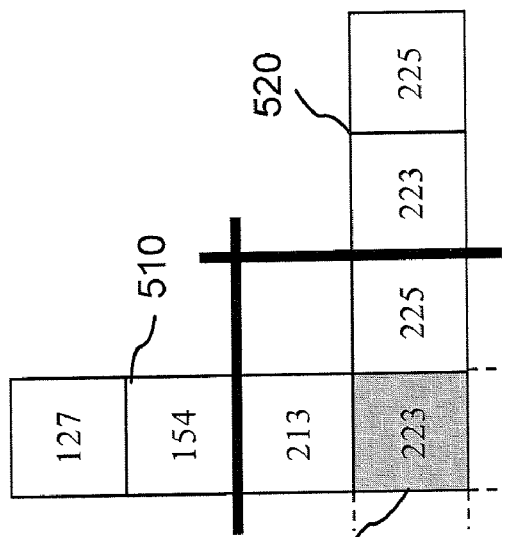
FIG. 9 is a schematic diagram illustrating the filtering of the target pixel shown in FIG. 8.
Figure 9:
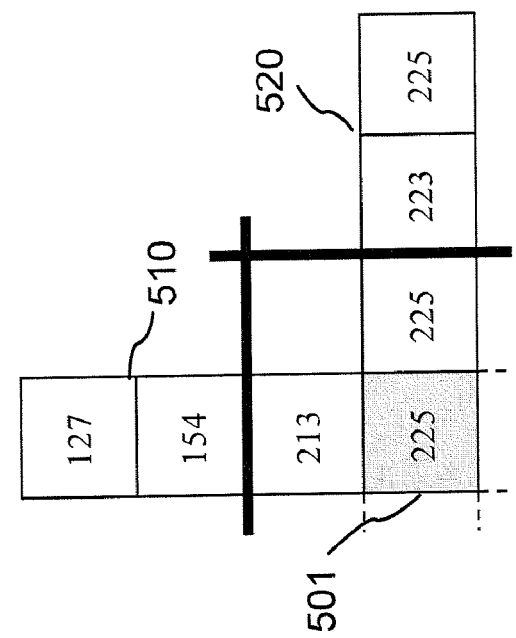

This filtering process is schematically illustrated in FIG. 9, wherein before filtering the target pixel 501 is shown to have a value 225, and after filtering symbolically indicated by a curved arrow, the target pixel, which is now labeled 501', has the new value 223.

Motion Compensation

Image encoders and image decoders for encoding and decoding video images are referred to herein as video encoders and decoders, respectively. The adaptive class-based filtering of the present invention can be advantageously used within a motion compensation circuit of a video encoder utilizing motion compensation and motion estimation techniques for block-wise coding of video images, for example in video encoders based on MPEG and H.264/AVC video compression standards. Motion compensation and motion estimation are conventionally used in video transmission and compression to reduce the amount of transmitted information when a video such as a motion picture is transmitted or saved. These methods are based on an observation that much of video content remains the same in consecutive frames, which may differ mainly by the motion of people or objects from frame to frame. This property is used to reduce the redundancy of the temporal domain in the motion compensation method. A volume of data to be transmitted can be minimized by taking out a similar region from the preceding picture or frame to fill a corresponding region, which has not been changed, or has very little change, in the present picture. The operation of finding the most similar blocks between pictures is called a motion estimation. The displacement representing a degree of motion is called a motion vector.

Figure 10:
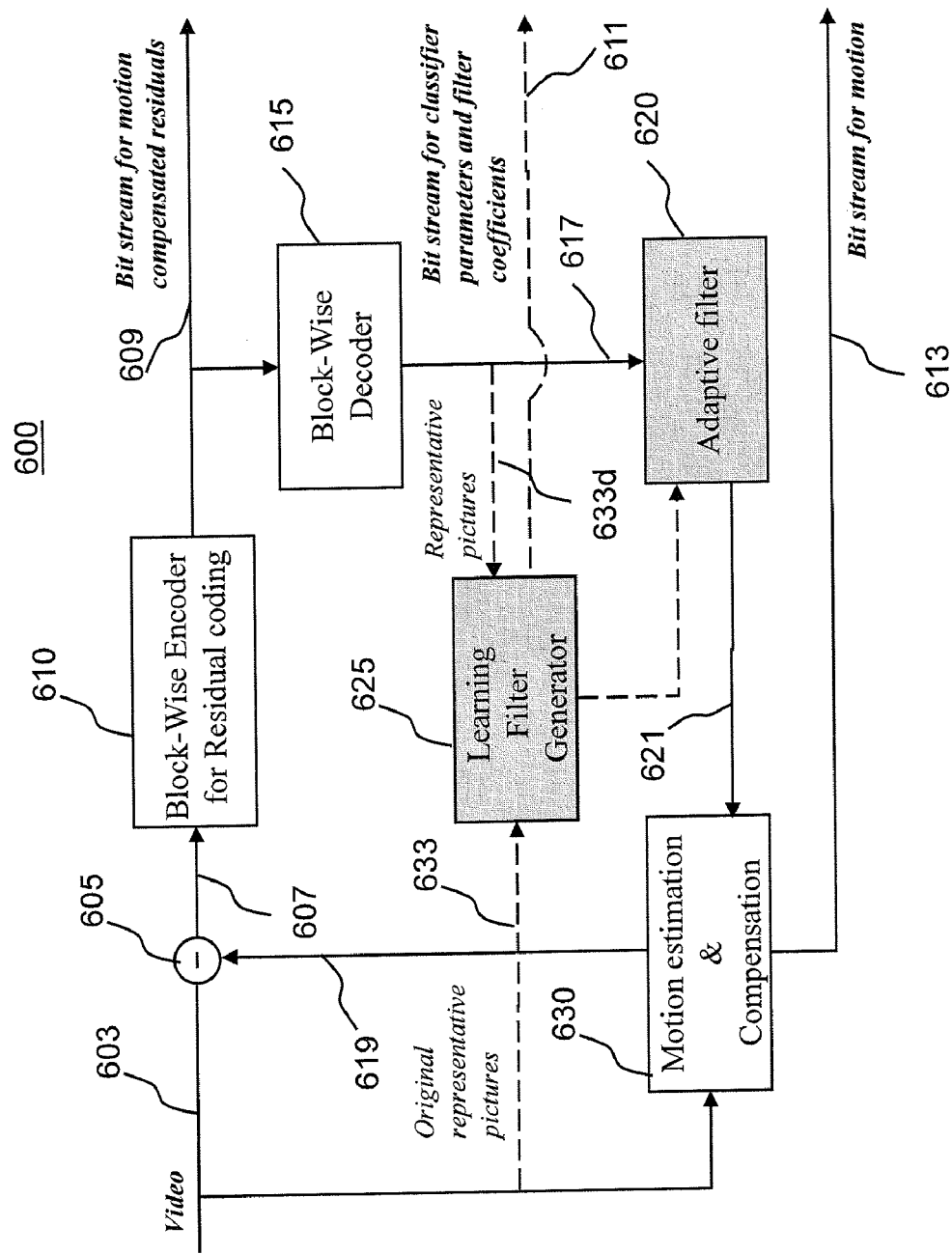
FIG. 10 is a block diagram of a first embodiment of a video encoder utilizing a class-based adaptive filter of the present invention in a motion compensation circuit.

An embodiment 600 of a video encoder with a learning de-blocking filter according to the present invention will now be described with reference to FIG. 10. The video encoder 600 includes a block-wise encoder 610 and a motion compensation circuit that is formed by a differential summer 605, a block-wise decoder 615, and a motion estimation and motion compensation unit (MEMC) 630, which in the absence of an adaptive filter 620 would be connected together in a known in the art arrangement as a motion estimation circuit 605-610-615-630-605. In addition to these prior art elements, the video encoder 600 includes also a learning filter generator (LFG) 625 that may be substantially identical to the LFG 120 described hereinabove with reference to FIG. 1, and the adaptive filter 620 that is substantially identical to the adaptive filter 230 described hereinabove with reference to FIG. 2.

Figure 11:
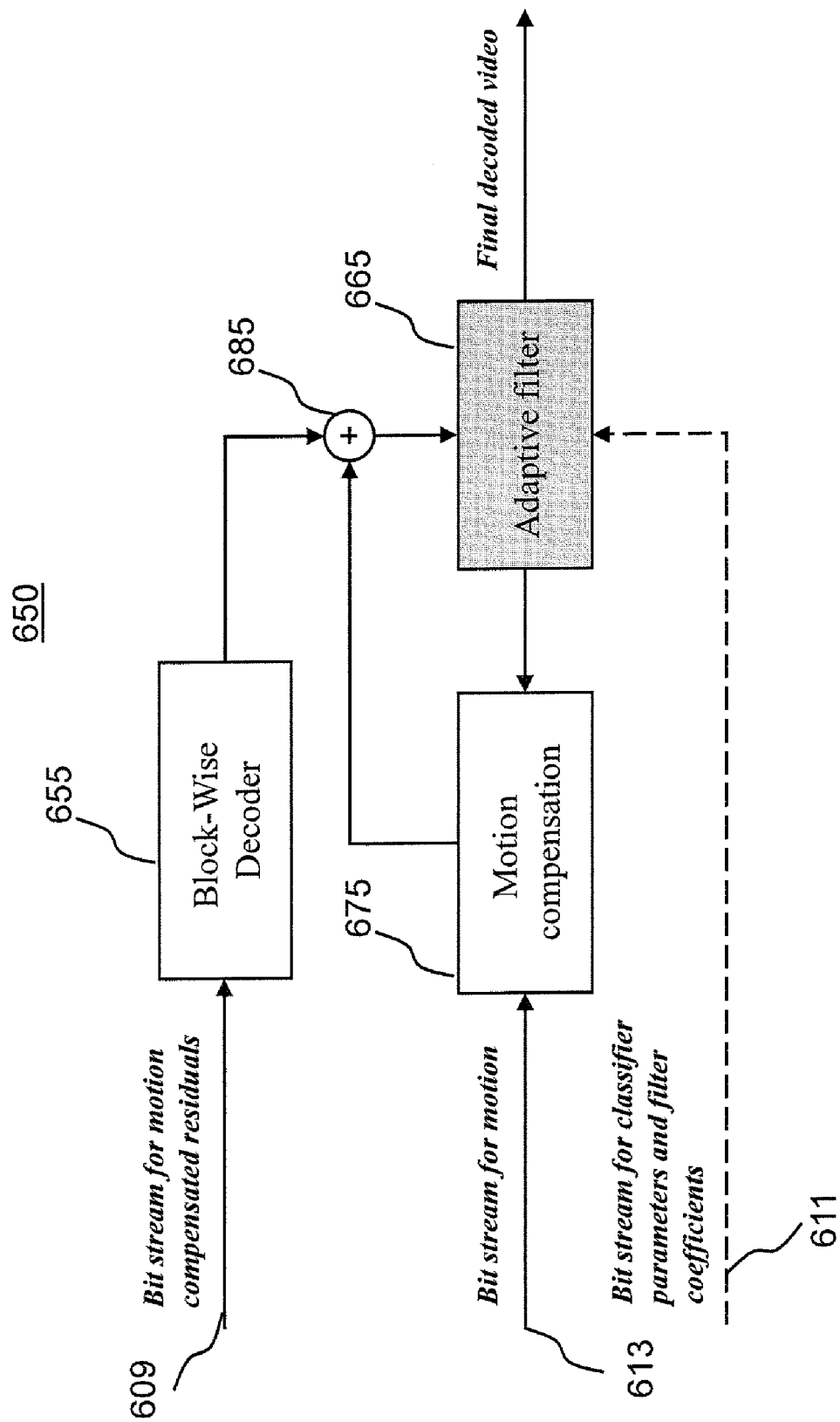
FIG. 11 is a block diagram of a video decoder for decoding video signals coded by the video encoder of FIG. 10.

In the absence of the LFC 625 and the adaptive filter 620, the video encoder 600 operates as known in the art. A sequence of video images in the form of sequential video frames, also referred to herein as pictures, is received at the differential summer 605. The current frame comes to the video encoder 600 as input image data $I_n(x,y)$ 603. In the differential summer 605 it is transformed into a differential frame $E_n(x,y)$ 607 by subtracting from it a prediction frame $P_n(x,y)$ 619 formed by the MEMC 630 on the basis of previous images. The differential frame 607 is block-wise encoded in the encoder 610, for example by sequentially performing the DCT and quantization operations on a block-by-block bases, and the coded differential frame 609, also conventionally referred to as the residual frame, is directed to an output data multiplexer (not shown) for multiplexing with motion data 613 and providing to an intended recipient. In order to form a new prediction frame $P_{n+1}(x,y)$, the coded differential frame 609 is also directed to the block-wise decoder 615, which produces a decoded differential frame which may be summed with the prediction frame $P_n(x,y)$ 619, resulting in a decoded frame 617, which may be saved in a frame memory (not shown). For coding the next frame, the decoded frame 617 is passed as a reference frame $R_n(x,y)$ to the MEMC 630, which computes motion vectors for each pixel and generates the new prediction frame $P_{n+1}(x,y)$ by shifting each pixel of the reference frame by a corresponding motion vector at the pixel location. The set of motion vectors includes all motion vectors related to the pixels of the frame to be compressed is also directed as motion data 613 to the output data multiplexer, which multiplexes it with the coded differential frame 609 for sending to a target recipient, such as a video decoder 650 that is shown in FIG. 11.

Since the encoder 610 performs image compression, which is a lossy operation, on a block-by-block bases, blocking artifacts may appear at and near the block boundaries. Although the image decoder 615 may include a de-blocking filter, such as that defined in the H.264/AVC video compression standard, this internal filter of the decoder 615 lacks the flexibility to adapt to a large variety of dynamically changing patterns that may be present in the input video frames, and therefore blocking artifacts are typically still present after such filtering.

To further reduce these blocking artifacts, the video encoder 600 includes the class-based adaptive filter 620 that is inserted in the data path between the block-wise decoder 615 and the MEMC 630 so as to filter the reference frames 617 the same way as the decoded images 210 are filtered in the image decoder 200 shown in FIG. 2, as described hereinabove. The adaptive filter 620 receives R&F data from the LFG 625, wherein the R&F data includes sets of classification rules for classifying CBFSB of the reference frame 617, and associated sets of class-optimized filter coefficients, and utilizes this data to classify pixels targeted for filtering into classes in dependence on values of neighbouring pixels forming a CBFSB, and to apply filters associated with the respective classes to adaptively filter the target pixels, for example as described hereinabove with reference to FIGS. 8 and 9.

The LFG 625 is operatively connected by data links shown by dashed lines such as 633 to an input port (not shown) of the video encoder 600 and to the block-wise decoder 615, wherefrom it receives representative training images 633 and corresponding decoded training images 615, respectively, in an arrangement substantially identical to that shown in FIG. 1, and operates as described hereinabove with reference to that figure.

The adaptive class-based filtering of the reference frame 617 produces a filtered reference frame 621; this filtered reference frame 621 has reduced blocking artifacts compared to the reference frame 617, which advantageously results in a more accurate motion compensation and enhances the quality of the video signal at the output of the video encoder 600.

With reference to FIG. 11, a video decoder 650 for decoding block-wise coded video signal generated by the video encoder 600 includes conventional elements such as a block-wise decoder 655, a summer 685, and a motion compensator 675. The decoder 655 receives the encoded differential frames 609 and decodes it using the same block-wise decoding algorithm as the decoder 615, and produces a decoded differential frame that is summed in the summer 685 with the prediction frame to produce a decoded frame. The prediction frame is produced on the basis of a previous reference frame by the motion compensator 675 using the motion data 613 received from the encoder 600.

In order to reduce blocking artifacts in the decoded frame, a class-based adaptive filter 665 is further provided according to the invention. This class-based adaptive filter is substantially identical to the filter 620 used in the video encoder 600; it receives the R&F data 611 from the LFG 625 of the video encoder 600, and operates as described hereinabove with reference to FIGS. 2, 8 and 9 to adaptively filter the decoded frame provided by the summer 685 based on the classification rules and associated filter coefficients generated by the LFG 625, to produce a filtered decoded frame that is provided as the final output of the video decoder 650. Additionally, this filtered decoded frame is also provided as the reference frame to the motion compensator 675.

In the video encoder 600 described hereinabove with reference to FIG. 10, the class-based adaptive filtering is applied to decoded frames prior to motion compensation.

Figure 12:
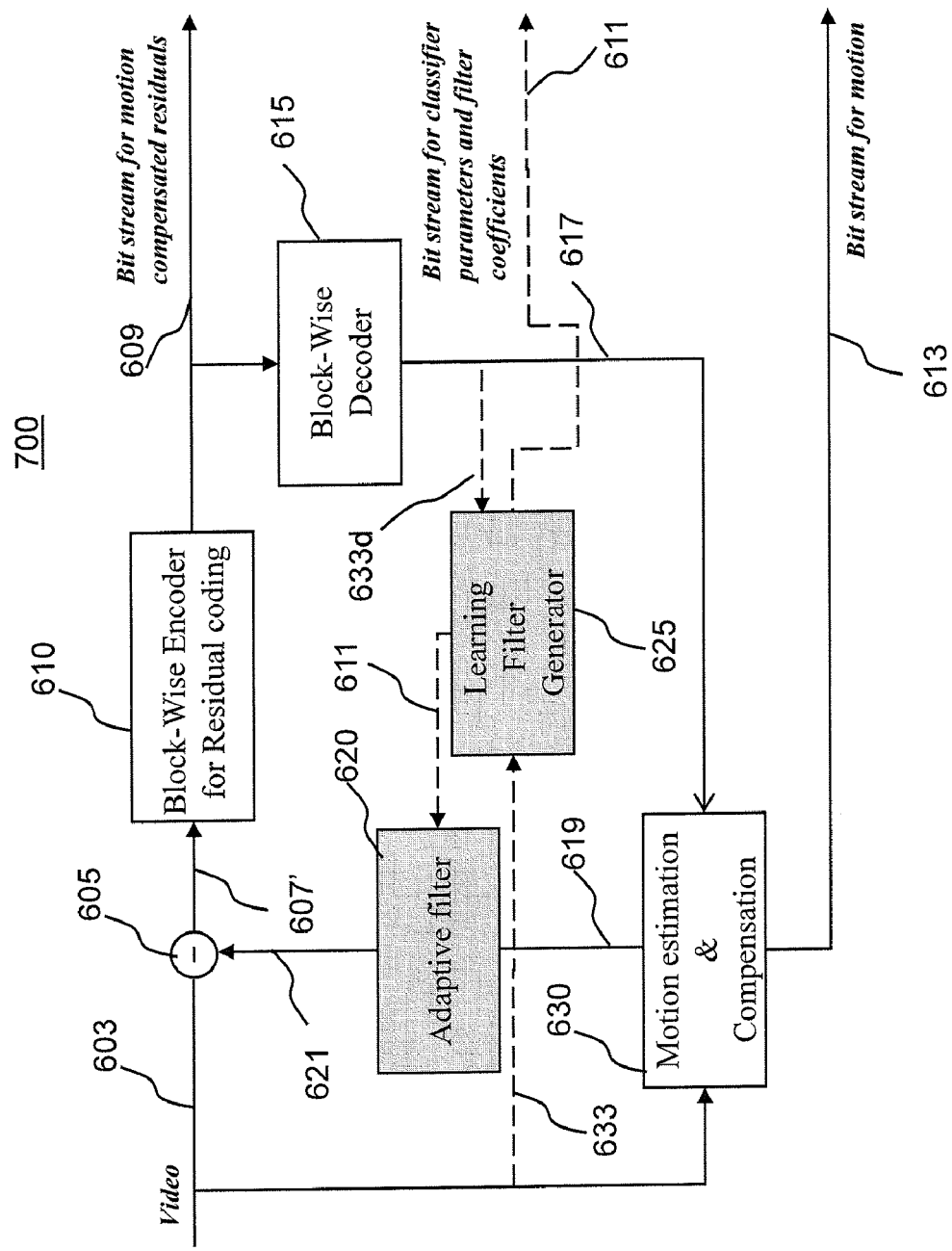
FIG. 12 is a block diagram of a second embodiment of a video encoder utilizing a class-based adaptive filter of the present invention in the motion compensation circuit.

With reference to FIG. 12, another embodiment of the invention provides a video encoder 700 that is similar to the video encoder 600 and includes all the same elements in a substantially same arrangement, except that the class-based adaptive filter 620 is inserted in the data link between the MEMC 630 and the differential summer 605 so as to filer the prediction frame 619 and produce a filtered prediction frame 621, that is then subtracted from the input video frame 603 to obtain a differential frame 607'.

Figure 13:
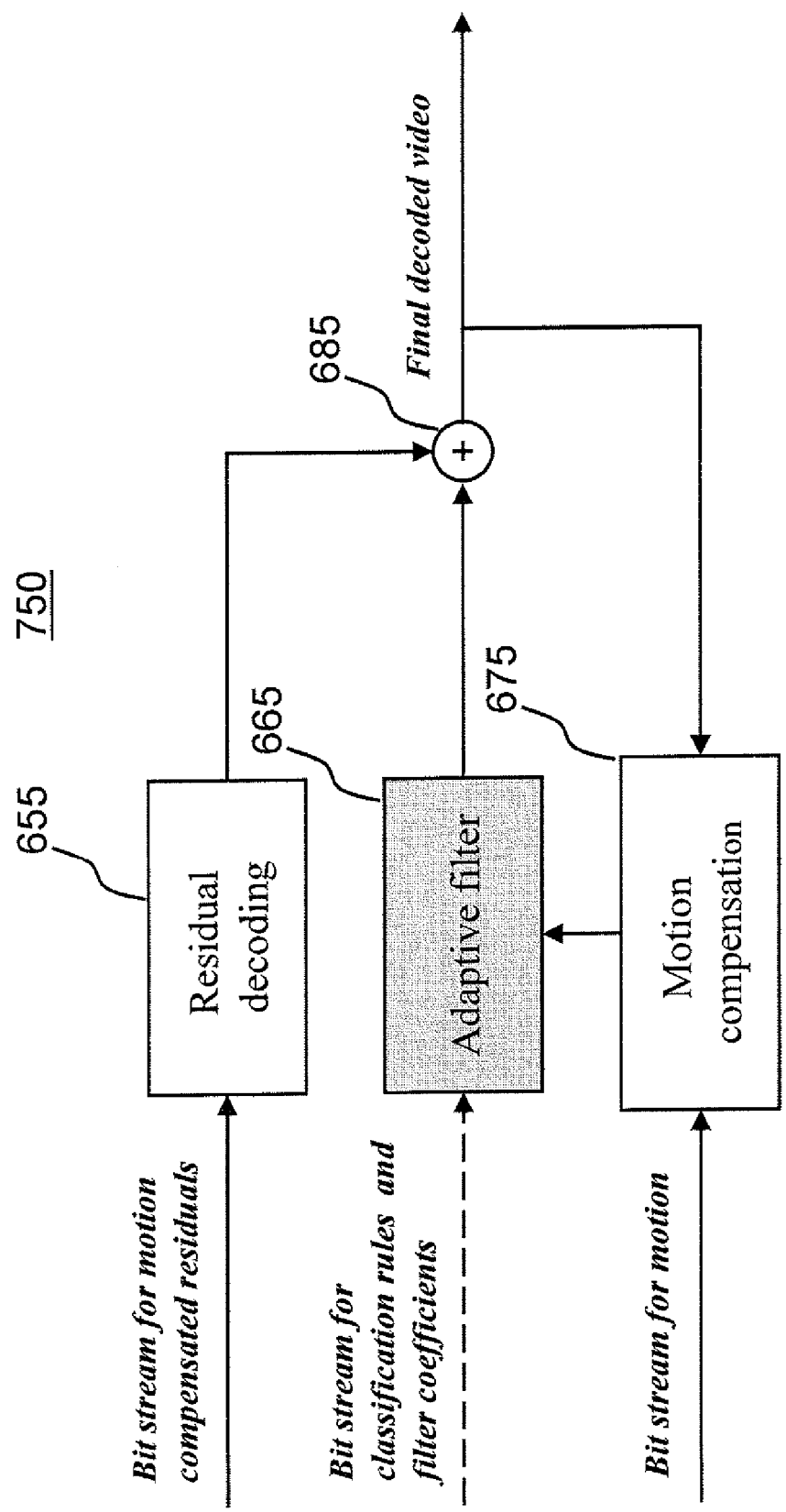
FIG. 13 is a block diagram of a video decoder for decoding video signals coded by the video encoder of FIG. 12.

With reference to FIG. 13, a video decoder 750 for decoding block-coded video signal generated by the video encoder 700 includes substantially same elements that the video decoder 700, except that the class-based adaptive filter 665 is inserted in the data path between the motion compensator 675 and the summer 685 so as to filter the prediction frame at the output of the motion compensator 675, similarly as it is done in the complimentary video encoder 700, so as to provide to the summer 685 a filtered prediction frame.

We found that the method and apparatus for adaptive deblocking filtering based on supervised machine learning according to the invention provides enhanced video quality as compared to conventional H.264/AVC codecs. In experimental investigations we performed, it provided an additional PSNR gain on the order of 0.7 dB, as described in further details in G. Huchet, J.-Y Chouinard, D. Wang and A. Vincent. <<Decision Tree for Denoising in H.264/AVC Video Sequences>>, Visual Communication and Image Processing Conference (VCIP), San-Jose, Calif., USA, 2008, which is incorporated herein by reference; here PSNR stands for pixel signal to noise ratio. The method was also found to visibly improve the image quality of the test video having QCIF resolution and coded using a H.264/AVC codec.

The supervised leaning approach used in the filtering method of the present invention may involve transmitting the classification rules such as decision trees and the associated filter coefficients for each scene to the decoder. The amount of information that needs to be transmitted is specific of a particular video sequence. By way of example, for the Foreman video sequence (QCIF, 30 fps) and a H264 video codec without intraprediction, the number of filters and associated filtering rules generated by an exemplary LFG utilizing the M5' algorithm varies between 7 and 130 when the quantization parameter QP changes from 20 to 40. However, experimental results show that the overhead may be negligible even in the case of high QP. For example, the overhead, i.e. the R&F data generated for the Foreman video sequence with QP=35 is approximately 44.2 kbits if it is written in a text file. Using a file compression method such as RAR file compression and archiving format, the file size is reduced to about 13 kbits. In one experiment, this overhead was used for 60 frames of this video sequence within which the scene does not change. Therefore, the overhead corresponds to only 6.5 kbps for a frame rate of 30 fps. In general, a scene lasts for at least 5 seconds, which means a scene change may happen after 150 frames for a frame rate of 30 fps, which reduces the overhead to below 3 kbps. Further improvements are expected in embodiments wherein the training data is formed using relative rather than absolute value of pixels.

The invention has been described hereinabove with reference to particular embodiments but is not limited thereto, and many other embodiments and variants of the method and apparatus described hereinabove may be envisioned by those skilled in the art. For example, although the concrete embodiments of the image and video encoders and decoders shown in FIGS. 1 and 2 are described hereinabove use the 4×4 coding blocks and linear CBFSB 40 comprised of a sequence of four adjacent pixels forming one-dimensional filtering windows, other embodiments may utilize block-wise video and image coders based on coding blocks of different, for example larger size, such as 8×8 or generally $M_b \times N_b$ pixel blocks, where $M_b$ and/or $N_b$ are/is larger than 4. With such block-wise encoders and decoders, embodiments may be designed utilizing CBFSB and filters with a different size and dimensionality. For example, embodiments using 8×8 coding blocks may be designed with one-dimensional CBFSB of size N=4, 6 and 8, defining the filter size, but could also be designed with two-dimensional CBFSB of size M×N and respective two-dimensional filters, where M is the number of pixels in the direction parallel to the boundary the CBFSB crosses and may be by way of example equal to 2,3, or 4, and N is the number of pixels in the direction normal to the boundary the CBFSB crosses, and may be by way of example equal to 4, 6, and 8, preferably centered at the boundary. In such embodiments adjacent CBFSB upon which the filtering is performed may share a target pixel to be filtered, so that the averaging of the filtered value described hereinabove with reference to overlapping vertical and horizontal CBFSB can be performed with the adjacent CBFSB crossing the same boundary. Furthermore, although the embodiments described herein utilize linear filters of the type described by equation (1), other embodiments may utilize non-linear filters. Different embodiments of the invention may also use different classification criteria for partitioning decoded images into classes of like CBFSBs, so as to enable the generation of class-specific filters that provide suitably low prediction errors for CBFSBs of each particular class; this criteria may include, but not limited to, the maximization of the standard deviation reduction of the original pixel values within a class, of the decoded CBFSB pixel values, of the prediction error, and of an entropy factor associated with the class as known in the art of machine learning; reduction of other parameters characterizing a distribution of CBFSBs within a class, such as the maximum deviation, may also be used. It should also be understood that each of the preceding embodiments of the present invention may utilize a portion of another embodiment, and should not be considered as limiting the general principals discussed herein.

Of course numerous other embodiments may be envisioned without departing from the spirit and scope of the invention as defined by the appended claims.

Appendix 1

This appendix describes an embodiment of the filtering method according to this invention that utilizes the WEKA software package for adaptive generation of classification rules and associated sets of filter coefficients.

Arff Format

WEKA works with a particular input file format of the training data called the Arff format. In application to the present invention, it defines a text file containing all the instances formed with the decoded and original CBFSB, an example of which is shown in FIG. 5. The instances are unordered and independent from each other. This text file is used by various classifiers included in WEKA to investigate how each attribute, i.e. the pixel values, can be predicted from each other. The text file representing the training data 135 is composed of two main parts. The file starts with the name of the relation, e.g. a dataset internal name, followed with the declaration of each attribute, i.e. a pixel name, and its type, numeric or integer, as follows:

@relation 'Pixels'
@attribute p__1 numeric
@attribute p__2 numeric
@attribute p__3 numeric
@attribute p__4 numeric
@attribute pO__1 numeric
@attribute pO__2 numeric
@attribute pO__3 numeric
@attribute pO__4 numeric Following the attribute definition, a "@data" line signals the start of the instances in the dataset. Instances are written one per line and the values of each attribute (pixel) is comma separated, as shown in FIG. 5.

M5Prime Classifier

The following function calls, or computer instructions, maybe used in the WEKA console to generate each of the four decision trees associated with the 4 pixels of the CBFSB 40. For each pixel, the first line generates an .arff file that contains a training dataset $\{TE\}_i$, i=1,2,3, or 4, composed of training examples TE with 5 attributes from the training data 135 composed of instances I having each attributes each. The training data 135 is in the file "name.arff", and for example training dataset $\{TE\}_1$ is contained in the file "first.arff". The second line calls the M5' routine that generates a decision tree, or in other words a set of classification rules, and corresponding linear models, or in other words—corresponding sets of filter coefficients $\{fc\}_{i,j}$.

Decision tree for the first pixel $p_1$:
  java weka.filters.unsupervised.attribute.Remove -R 6-8 -i name.arff -o first.arff
  java weka.classifiers.trees.M5P -t first.arff
Decision tree for the second pixel $p_2$:
  java weka.filters.unsupervised.attribute.Remove -R 5, 7-8 -i name.arff -o second.arff
  java weka.classifiers.trees.M5P -t second.arff Decision tree for the third pixel $p_3$:
 java weka.filters.unsupervised.attribute.Remove -R 5-6, 8 -i name.arff -o third.arff
 java weka.classifiers.trees.M5P -t third.arff
Decision tree for the forth pixel $p_4$:
 java weka.filters.unsupervised.attribute.Remove -R 5-7 -i name.arff -o fourth.arff
 java weka.classifiers.trees.M5P -t fourth.arff The output of each set of command line is a text version of the decision tree followed with the linear models, which can be saved in a text file.

The LC 140 includes a text coder that converts the text file with the tree structure and the filter coefficients into a computer-readable language, such as a binary code, as known in the art. Finally, this code is used by the adaptive filter 230 to create a filtering function where the inputs are pixels' value of a CBFSB in a decoded image 213 to be filtered.

Examples of Alternative Classifiers

The WEKA package includes alternative classifiers that may be used in other embodiments of the invention, including but not exclusively a linear regression classifier based on the M5P algorithm, and a multilayer perception algorithm, also known as a neural network, which utilizes error back propagation For example, the M5P linear regression algorithm of WEKA can be used in the LFG 120 by means of the following computer instructions to generate a unique linear filter for the first pixel $p_1$:
 java weka.filters.unsupervised.attribute.Remove -R 6-8 -i name.arff -o first.arff
 java weka.classifiers.functions.LinearRegression -t first.arff The output of the last command line is a text version of a unique linear filtering model. In this case there is no classification rules associated therewith.

In another example, the LFG 120 may use a multilayer perception algorithm of WEKA by means of the following computer instructions to generate a set of classification rules and associated linear filters for the first pixel $p_1$:
 java weka.filters.unsupervised.attribute.Remove -R 6-8 -i name.arff -o first.arff
 java weka.classifiers.functions.MultilayerPerceptron -L 0.3 -M 0.2 -N 500 -E 20 -H a -t first.arff In this example, the classifier used is a simple structure neural network which contains 1 hidden layer which consists of 2 nodes. In other embodiments, more complicated neural network structures may be used. The execution of the second command line generates the R&F data in a text format including the weight values associated with each input that reaches each node and a threshold value necessary for computing the node output.

Appendix 2

The following is an exemplary text file that may be generated by the LC140 in an embodiment utilizing an iterative partitioning algorithm such as M5'. First 18 lines including inequalities of the form "i<s" and "i>s" are the classification rules to be applied by the sorter 235 to CBFSB of decoded images, where "i" refers to a CBFSB pixel/attribute position that is being tested, with i=1, 2, 3, or 4, and "s" refers to the threshold value for said pixel/attribute. "x" at the end of a line refers to a linear model, or a set of filter coefficients that is associated with CBFSB that satisfy the preceding conditions. Sets of filter coefficients are given by lines/strings includes four signed integers representing decimal digits of the first four filter coefficients and a floating point number.

```
1<166
    1<112
        1<87
            1<69
                1<52
                    1<32 x
                    1>32 x
                1>52 x
            1>69 x
        1>87 x
    1>112 x
1>166
    1<211
        1<195 x
        1>195 x
    1>211
        1<229
            1<219
                2<214
                    2<211 x
                    2>211 x
                2>214
                    2<216 x
                    2>216
                        1<215
                            4<217
                                4<211 x
                                4>211 x
                            4>217 x
                        1>215 x
            1>219
                2<222
                    3<215
                        3<177
                            3<153
                                3<134 x
                                3>134 x
                            3>153 x
                        3>177 x
                    3>215
                        3<217 x
                        3>217
                            1<222 x
                            1>222
                                1<224 x
                                1>224 x
                2>222 x
            1>229 x
408 015 0281 0026 8.4295
4836 015 0429 0026 22.6977
8375 0074 -0034 0026 10.2797
9515 0025 -0456 0423 4.0384
8791 1068 -0619 0569 2.5462
9551 0869 -0518 0001 1.3594
8984 0998 -0943 0004 19.0219
7101 0945 -0513 0184 46.8754
0503 0112 -0011 0024 197.8327
0503 0109 -0011 0024 200.6863
4536 0049 -0011 0321 110.647
2022 1273 0343 0306 126.6386
2022 1273 0343 0249 129.163
2022 3529 066 0177 76.1711
7788 0191 -0912 0737 47.3382
4695 0108 -0829 0613 114.2563
4695 012 -0788 1005 106.7538
9054 0244 -0373 1424 -3.2477
2421 1389 -0356 0178 134.7765
1973 0316 -0376 0248 169.1731
1973 0316 -0376 0248 170.5734
0469 0316 -0376 -2244 259.0982
0674 0316 -0376 -1347 234.5528
1.3048 -2521 -0679 0877 -16.0789
6465 2282 -0926 141 18.0296
```

We claim:

1. A method for block-wise encoding still or video images comprising the steps of:
   a) encoding input image data composed of pixels having original pixel values using a block-wise encoder to obtain encoded image data;
   b) decoding at least a subset of the encoded image data to obtain a decoded image composed of pixels having decoded image values;
   c) identifying in the decoded image a plurality of coding block boundaries;
   d) forming training data comprising a plurality of cross-boundary filter support blocks (CBFSBs), each CBFSB comprising a group of N>1 adjacent pixels of the decoded image including adjacent pixels on both sides of a block boundary;
   e) generating a set of classification rules based on the training data for classifying each of the CBFSBs into at least one of a plurality of classes, so that each class is adaptively defined by a respective set of the classification rules;
   f) for each class defined in step (e), generating a set of filter coefficients associated with the class and defining a class-optimized filter that provides a prediction value of a selected CBFSB pixel in dependence upon decoded values of CBFSB pixels based on an original value of the selected CBFSB pixel for each CBFSB in said class; and,
   g) providing the sets of filter coefficients for each class and the classification rules as an output for subsequent adaptive class-based filtering of the decoded image data for suppressing blocking artifacts.

2. A method according to claim 1, wherein step (e) is performed using a supervised machine learning algorithm.

3. A method according to claim 2, wherein the supervised machine learning algorithm is one of: an M5 algorithm, an M5' algorithm, a multilayer perception algorithm, or a linear regression algorithm.

4. A method according to claim 2, wherein the supervised machine learning algorithm comprises iterative partitioning of the training data.

5. A method according to claim 1, further comprising the steps of:
   h) receiving the encoded image data, the filter coefficients for each class, and the classification rules;
   i) decoding the encoded image data to obtain received image data;
   j) selecting a target pixel in the received image data;
   k) identifying in the received image data a first nearest block boundary in the vicinity of the target pixel;
   l) selecting a first CBFSB of size N that includes the target pixel and crosses said first nearest block boundary;
   m) classifying the first CBFSB into one of the classes defined in step (e) using the received classification rules, and selecting a first set of filter coefficients associated therewith from the received sets of filter coefficients;
   n) applying the first set of filter coefficients to the first CBFSB to obtain a first filtered pixel value for the target pixel.

6. A method according to claim 5, further comprising the steps of:
   k2) identifying in the received image data a second nearest block boundary in the vicinity of the target pixel;
   l2) selecting a second CBFSB of size N that includes the target pixel and crosses said second nearest block boundary;
   m2) classifying the second CBFSB into one of the classes defined in step (e) using the received classification rules, and selecting a second set of filter coefficients associated therewith from the received sets of class-optimized filter coefficients;
   n2) applying a corresponding set of class-optimized filter coefficients to the second CBFSB to obtain a second filtered pixel value for the target pixel; and,
   o) averaging the first and second filtered pixel values to obtain a new filtered value of the target pixel.

7. A method according to claim 6, wherein the first and second nearest block boundaries are vertical and horizontal boundaries of a same coding block.

8. A method according to claim 1 wherein the input image data comprises a sequence of video images, the method comprising the steps of:
   selecting the subset of the encoded image data that corresponds to a representative image from the sequence of video images, and
   applying the classification rules and the class-optimized filters for filtering other decoded images of the input sequence of video images.

9. A method according to claim 1 for use in a video encoder utilizing motion estimation and motion compensation, wherein the input image data comprises a sequence of input video images, wherein step (b) comprises generating a sequence of decoded images corresponding to the sequence of input video images, the method further comprising the step of
   applying the classification rules and the class-optimized filters for filtering each decoded image from the sequence of decoded images prior to performing the motion compensation thereon.

10. A method according to claim 1 that is used in a video encoder utilizing motion estimation and motion compensation, wherein the input image data comprises a sequence of input video images, wherein step (b) comprises generating a sequence of decoded images corresponding to the sequence of input video images, the method further comprising the step of
    applying the classification rules and the class-optimized filters for filtering each decoded image from the sequence of decoded images after performing the motion compensation thereon.

11. A method according to claim 1, wherein steps (e) and (f) comprise the steps of:
    e1) selecting a pixel position i within each CBFSB for filtering;
    e2) identifying from the input image data original pixel values $p^o_i$ corresponding to the i-th pixel position in each CBFSB;
    e3) forming a plurality of training instances I, each training instance I comprising N decoded pixel values of one of the CBFSB and the original pixel value $p^o_i$ for the i-th pixel position in said CBFSB;
    e4) processing the plurality of training instances I to obtain classification rules for classifying the training instances I according to a selected classification criterion using a supervised machine learning algorithm;
    f1) for each of the classes identified in step e4), determining the respective class-optimized filter providing the predicted values of pixels at the i-th CBFSB location; and, f2) repeating steps (e1)-(e4) for at least one other pixel position j within each CBFSB.

12. A method according to claim 11, wherein the selected classification criterion comprises maximizing a standard deviation reduction value for a group of CBFSBs.

13. A method according to claim 12, wherein step (e) includes splitting a group of CBFSBs in two or more subgroups in dependence on a pixel value of one of the CBFSB pixels.

14. A method according to claim 1, wherein the classification rules comprise ranges of pixel values associated with pixel positions in an CBFSB.

15. A method according to claim 1, wherein step (f) is performed using a linear regression algorithm, and comprises computing a difference between the prediction value and the original pixel value to determine a prediction error for each CBIS of a class, and selecting a set of filter coefficients that minimizes or maximizes a merit function based on the prediction errors for each of the CBIS of the class.

16. A method for block-wise decoding still or video images encoded by the method of claim 1, comprising the steps of:
   receiving the encoded image data, the set of classification rules for classifying cross-boundary filter support blocks (CBFSB) into at least one of the plurality of classes, and the sets of filter coefficients associated with said classes;
   decoding the encoded image data with a block-wise decoder to obtain the received image data;
   identifying a plurality of coding block boundaries in the received image data;
   for a target pixel in the received image data, performing the steps of:
   identifying a CBFSB in the received image data that comprises said target pixel and crosses one of the coding block boundaries;
   classifying said CBFSB into one of the adaptively defined classes using the received set of classification rules; and,
   applying to the identified CBFSB in the received image data the filter coefficients associated with said class to obtain a filtered value of the target pixel.

17. An image encoder for encoding still or video images, comprising:
   a block-wise encoder for generating encoded image data from input image data comprised of pixels having original pixel values using coding blocks having coding block boundaries;
   a block-wise decoder operatively connected to the block-wise encoder for receiving at least a subset of the encoded image data and for generating therefrom a decoded image comprised of pixels having decoded pixel values;
   a training data generator for forming a training dataset comprising a plurality of cross-boundary filter support blocks (CBFSB), each CBFSB comprising a group of N>1 adjacent pixels of the decoded image including adjacent pixels on both sides of a block boundary;
   a learning classifier operatively connected to the input port and the training data generator for receiving the input image and the corresponding decoded image for generating therefrom
      a set of classification rules for classifying each of the CBFSBs into at least one of a plurality of classes that are thereby adaptively defined, and
      at least one set of class-optimized filter coefficients for each adaptively defined class so that filtered values of CBFSB pixels obtained using said filter coefficients approximate original pixel values of respective pixels for all CBFSB associated with said class; and,
   a data port coupled to the block encoder and the learning classifier for providing the encoded image data, the classification rules and the set at least one set of the class-optimized filter coefficients as an output for subsequent decoding and class-based pixel filtering for reducing blocking artifacts.

18. An image encoder of claim 17 comprising a coding block detector for identifying a plurality of coding block boundaries in the decoded image.

19. An image decoder for decoding still or video images that have been encoded with the image encoder of claim 17, comprising:
   a data port for receiving the encoded image data, the classification rules for classifying cross-boundary filter support blocks (CBFSB) into at least one of the classes adaptively defined at the image encoder of claim 16, and the sets of filter coefficients associated with said classes;
   a block-wise decoder for decoding the encoded image data to obtain the received image data;
   an adaptive filter coupled to the block-wise decoder for class-based filtering of target pixels of the received image data, comprising:
      an CBFSB sorting section configured to identify, for each of the target pixels in the received image data, an CBFSB that comprises said target pixel and crosses a coding block boundary, and to associate said CBFSB with one of the adaptively defined classes using the received set of classification rules; and,
      a filtering section for applying to each of the CBFSBs identified in the received image data one of the sets of class-optimized filter coefficients according to a respective class associated therewith.

20. An image decoder of claim 19 comprising a block detector for identifying coding block boundaries in the received image data.

* * * * *

UNITED STATES PATENT AND TRADEMARK OFFICE
CERTIFICATE OF CORRECTION

PATENT NO. : 8,204,128 B2
APPLICATION NO. : 12/184671
DATED : June 19, 2012
INVENTOR(S) : Huchet et al.

It is certified that error appears in the above-identified patent and that said Letters Patent is hereby corrected as shown below:

Col. 2, line 32, "cross-boundary image patters" should read -- cross-boundary image patterns --

Col. 5, line 2, "set of pre-defined filter" should read -- set of pre-defined filters --

Col. 7, line 54, "filtering that is substantially continuously" should read -- filtering that continuously --

Col. 9, line 13, "N as shown in FIG. 1," should read -- N as shown in FIG. 4, --

Col. 9, line 41, "attributes $p_i$ and for" should read -- attributes $p_i$ and four --

Col. 10, line 64, "<<Decision Tree" should read -- Decision Tree --

Col. 10, line 65, "Video Sequences>>" should read -- Video Sequences --

Col. 11, line 11, "branch 321 corresponds" should read -- branch corresponds --

Col. 11, line 66, "subsets $T_0$ and $T_1$." should read -- subsets $T_{s,0}$ and $T_{s,1}$. --

Col. 12, line 62, "reaches node 410 is first" should read -- reaches node 401 is first --

Col. 12, line 63, "subset includes all" should read -- subset that includes all --

Col. 12, line 66, "third and fourth subsets," should read -- third and fourth subset, --

Col. 13, line 1, "and the forth subset" should read -- and the fourth subset --

Col. 13, line 19, "another class T27" should read -- another class $T_{27}$ --

Col. 13, line 21, "remainder T406 of the subset T405, a subset T406, is split at" should read -- remainder $T_{406}$ of the subset $T_{405}$, a subset $T_{406}$, is split at --

Col. 13, line 23, "a class T24 with an" should read -- a class $T_{24}$ with an --

Col. 13, line 24, "the remainder T407" should read -- the remainder $T_{407}$ --

Col. 13, line 25, "the subset T406 is split" should read -- the subset $T_{406}$ is split --

Col. 15, lines 12 and 13, "block boundary 525;" should read -- block boundary; --

Col. 15, line 16, "block boundary 535;" should read -- block boundary; --

Signed and Sealed this
Fourth Day of December, 2012

David J. Kappos
*Director of the United States Patent and Trademark Office*

CERTIFICATE OF CORRECTION (continued)
U.S. Pat. No. 8,204,128 B2

Col. 15, line 55, "vertical 525 and horizontal 535 CBFSB" should read -- vertical and horizontal CBFSB --

Col. 15, line 58, "the first CBFSB 525 and the second CBFSB 535 are" should read -- the first CBFSB and the second CBFSB are --

Col. 16, line 6, "the vertical CBFSB 525" should read -- the vertical CBFSB --

Col. 17, line 67, "training images 615," should read -- "training images 633d," --

Col. 18, line 63, "<<Decision Tree" should read -- Decision Tree --

Col. 18, line 64, "Sequences>>, Visual" should read -- Sequences, Visual --